US009543103B2

(12) United States Patent
Pinto, IV et al.

(10) Patent No.: US 9,543,103 B2
(45) Date of Patent: Jan. 10, 2017

(54) ACTIVATION OF HUMAN-PROTECTING SAFETY MECHANISMS USING SMART MATERIALS

(75) Inventors: Nicholas W. Pinto, IV, Ferndale, MI (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1076 days.

(21) Appl. No.: 13/335,127

(22) Filed: Dec. 22, 2011

(65) Prior Publication Data

US 2013/0162056 A1 Jun. 27, 2013

(51) Int. Cl.
*H02H 11/00* (2006.01)
*H01H 85/00* (2006.01)

(52) U.S. Cl.
CPC ...... *H01H 85/00* (2013.01); *H01H 2085/0004* (2013.01)

(58) Field of Classification Search
USPC .......................................................... 307/326
See application file for complete search history.

(56) References Cited

U.S. PATENT DOCUMENTS 5,563,390 A * 10/1996 Demissy .................. H01H 3/30 218/140
2009/0147417 A1* 6/2009 Goodsell ................ H01H 83/04 361/42
2012/0169451 A1* 7/2012 Mooney ............... H01H 71/145 337/382

* cited by examiner

*Primary Examiner* — Rexford Barnie
*Assistant Examiner* — Xuan Ly
(74) *Attorney, Agent, or Firm* — Parks IP Law LLC; Mickki D. Murray, Esq.

(57) ABSTRACT

The present disclosure relates to a system, for selectively actuating a safety mechanism, to protect against electrical shock, using a transformable material. The system includes the transformable material, being: (1) connectable electrically to an electrical component having an unwanted electrical charge and (2) changeable between a deformed shape and an undeformed shape based on electrical input resulting from the electrical charge at the electrical component. The transformable material is also (3) connected mechanically to the safety mechanism so that change in the transformable material causes movement of the safety mechanism. The transformable material is further (4) configured and arranged in the system to, in response to being exposed to the electrical input, change to its undeformed shape and thereby actuate the safety mechanism.

20 Claims, 13 Drawing Sheets

ACTIVATION OF HUMAN-PROTECTING SAFETY MECHANISMS USING SMART MATERIALS

TECHNICAL FIELD

The present disclosure relates generally to activating safety mechanisms using a smart material and, more particularly, to systems and methods for actuating safety locks, shields, and alarms, and in some instances removing unwanted electric charge, using the smart material.

BACKGROUND

Various safety features have been used to protect people from electrical shock from electrical devices such as breaker boxes, other types of control boxes, and battery systems. Safety features also exist to protect people from other hazardous conditions such as high heat, cold, or radiation levels.

A common safety feature for breaker boxes or control boxes is a mechanical locking mechanism that engages automatically whenever a main power switch is turned on.

Turning to the figures, and more particularly the first figures, FIG. 1 shows an example of a breaker box or control box 100, referred to generally as a power box. The power box 100 is used in an environment 102, such as an assembly plant or factory. The power box 100 has an input 103 for receiving a main power source 104, such as a power input cable.

The power box 100 shown in FIG. 1 includes a cover panel or door 106 or other access component or feature. Some power boxes 100 (not shown in FIG. 1) are open, lacking such a door. The box 100 can also include a conventional lock 108 releasable by a release switch 110. And the box 100 can have a power breaker or switch 112 controlling input of power to the box from the power source 104. In some cases, the lock and switch are connected indirectly so that throwing the switch to turn the power on also results in the lock locking.

At least some embodiments having such a switch 112, or other activating feature that can be selectively activated by a person, can be referred to as active-actuation systems, being configured and arranged to be actuated actively for actuating one or more safety mechanisms—e.g., locking mechanism, blocking mechanism, and mechanism to hold closed an electrical connection between the source and a load (e.g., alarm(s), resistor(s), etc.), thereby promoting drainage of unwanted electrical charge. The mechanism described primarily in connection with FIGS. 2-8, consists of the prior two mechanisms, the locking and blocking mechanisms.

When the main power to such boxes is turned off—e.g., the main power switch 112 is turned off (and a main lock can here be automatically released), residual power may still be in the system, such as by not having discharged from each sub-unit within the box, or by the system being mis-wired. In this event, personnel accessing the box may be exposed undesirably to the charge, believing that they were safe due to the box being unlocked/openable and/or the switch being turned off.

Some boxes have secondary power feeds, which can be mis-wired so the current therefrom reaches undesirably certain parts of the system 200 with which users could come into contact. An example secondary power feed is identified by reference numeral 105 in FIG. 1. As an example, the system 200 could include a separate A/C line, such as a 120-volt line (single-phase or three-phase, for instance), and, if a part of the system is mis-wired, its power could back feed into a main machine so that even though a main switch or breaker is switched off, and the mechanical lock released, power could still be supplied to the system. As another example, the system 200 could include a DC line, such as in regards to capacitor power cabinets connected to DC motor drives.

Again, personnel accessing the box may be exposed undesirably to the charge, believing that they are safe due to the box opening.

Risk of shock is also present in connection with electrical devices having a local battery source. For instance, in the event of an emergency, charge stemming from the battery could theoretically extend to various parts external and proximate to it.

Regarding temperature and radiation, a common safety system is to use a chromo-sensitive material that changes its appearance when exposed to heat, cold or radiation, thereby warning people of the condition. Other systems use gages, such as a thermometer or radiometer to warn people. One shortcoming of these methods is that they still allow the people, who may or may not notice the warning, to access the hazardous condition, which can occur.

Systems and methods for protecting persons from electric charge and other unwanted conditions (e.g., heat, cold, radiation) in these and similar scenarios are desirable.

SUMMARY

The present disclosure relates in one aspect to a system, for selectively actuating a safety mechanism, to protect against electrical shock, using a transformable material. The system includes the transformable material, being: (1) connectable electrically to an electrical component having an unwanted electrical charge and (2) changeable between a temporary shape and an original shape based on electrical input resulting from the electrical charge at the electrical component. The transformable material is also (3) connected mechanically to the safety mechanism so that change in the transformable material causes movement of the safety mechanism. The transformable material is further (4) configured and arranged in the system to, in response to being exposed to the electrical input, change to its original shape and thereby actuate the safety mechanism.

In one aspect, the present disclosure provides a method, for operating a system to selectively actuate a safety mechanism, to protect against electrical shock, using a transformable material. The method includes closing an electrical switch positioned between the transformable material and an electrical component having the unwanted electrical charge, thereby allowing electrical current caused by the charge to flow from the electrical component to the transformable material. The method also includes receiving, at the transformable material, in response to the electrical switch closing, the electrical current, and the transformable material changing, in response to receiving the electrical current, from a temporary shape to an original shape of the material. The method further includes the transformable material, by changing to its original shape, causing actuation of the safety mechanism.

In one aspect, the present disclosure provides another system, for selectively actuating a safety mechanism, to protect against electrical shock, using a transformable material. This system also includes the transformable material being (i) connectable electrically to an electrical component having an unwanted electrical charge, (ii) changeable between a temporary shape to an original shape based on electrical input resulting from the electrical charge at the electrical component, (iii) connected mechanically to the safety mechanism so that change of the transformable material causes movement of the safety mechanism, and (iv) configured and arranged in the system to, in response to being exposed to the electrical input, change to its original shape and thereby actuate the safety mechanism. In this aspect, the safety mechanism includes at least one element selected from a group of elements consisting of (a) a movable locking component configured and arranged to lock, when actuated, an access feature associated with the electrical component to limit physical access to the electrical component, (b) a movable blocking element that is configured and arranged to move, when actuated by the transformable material, to a blocking position to limit physical access to the electrical component, and (c) an openable/closable electrical switch positioned between the transformable material and the electrical component and configured and arranged to stay in a closed position thereby maintaining an electrical connection between the electrical component and a draining sub-system configured and arranged to reduce unwanted electrical charge in the electrical component.

In a particular embodiment, the safety mechanism in the above-mentioned aspects includes a component holding closed an electrical connection between an unwanted electrical charge and a safety sub-system that drains and/or notifies of the unwanted electrical charge. In one particular embodiment, the safety mechanism in the above-mentioned aspects includes a locking mechanism or a blocking mechanism.

In another aspect, the present disclosure provides a system, for selectively actuating a safety mechanism, to protect against exposure to an unwanted stimulus, using a transformable material. The system includes a biasing element and the safety mechanism. The safety mechanism is configured to be selectively moved, against force of the biasing element, by operation of the transformable material to one of an engaged position and an unengaged position. The system also includes the transformable material, which is in this aspect configured and arranged in the system so that, in operation of the system, when the transformable material is exposed to the stimulus, the transformable material changes from a first form to a second form, thereby causing motion of the safety mechanism. In a particular embodiment, the safety mechanism includes a lock and/or a shield. In a particular embodiment, the stimulus can variously be one or more of heat, lack of heat (e.g. cold), and radiation.

Other aspects of the present invention will be in part apparent and in part pointed out hereinafter.

DETAILED DESCRIPTION

Figure 1:
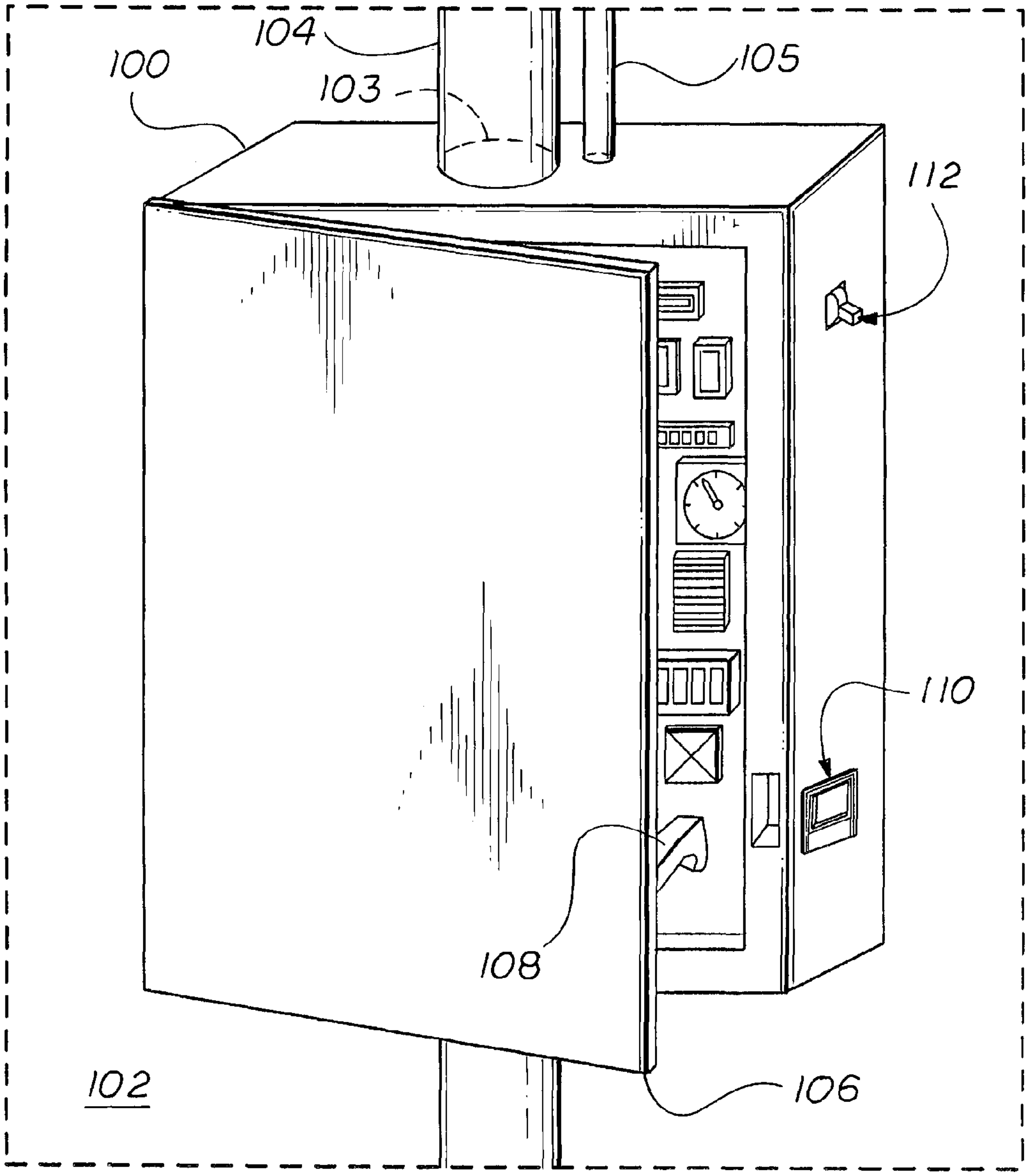
FIG. 1 illustrates a conventional breaker or control box.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

Overview of the Disclosure

The present technology makes use of transformable materials, such as a smart materials and more particularly Shape Memory Alloys (SMAs), which can be readily deformed at low temperature but transform to a much stronger state (for shape memory alloys this is approximately a 2.5 times increase in modulus) above their transformation temperature.

In various particular embodiments, the present disclosure describes systems and methods for actuating safety locks and alarms using a transformable material. The disclosure also describes systems and methods for removing unwanted electric charge from a local source, such as a battery, using a smart material.

Generally, transformable materials, such as smart materials, are those having one or more properties that can be changed in a controlled fashion by external stimuli, such as temperature, electric field, stress, magnetic field, or pH level.

Common smart materials include piezoelectric materials, shape-memory alloys, shape-memory polymers, magnetostrictive materials, magnetic shape-memory alloys, pH-sensitive polymers, temperature-responsive polymers, and chromic materials.

While transferable materials are referred to herein mostly as smart materials for convenience, uses of the term smart are not intended to limit the material to being a certain type of transformable material, and references herein to smart materials should be considered to include broader readings whereby the material can be a transformable material other than what might be considered as only a smart material.

Most embodiments of the present disclosure use smart materials configured to change shape responsive to electrical or heat input. Common smart materials of this type are shape-memory alloys.

A shape-memory alloy is a metal alloy that remembers a cold-forged shape. This shape may also be referred to as an original, initial, or permanent state. The alloy, if deformed from this original shape by an applied load will return to it, i.e. exhibit shape memory in response to being exposed to an input of heat or electric current. Shape-memory alloys are commonly known by names including the following: SMA, smart metal, memory metal, memory alloy, muscle wire, and smart alloy.

In some embodiments, the present technology involves connecting the smart material to a part having an unwanted electrical charge. An example part is a power box line having unwanted residual charge, such as from electricity that remains in components of the box after power to the box has already been disconnected. In another example, there is at least one secondary source of power for the box, such as a small power line distinct from a main power line (e.g., main power line 104). In still another example, unwanted charge exists in a system, or electrical sub-system thereof, stemming from a local power source, such as a battery.

The technology also includes one or more security mechanisms connected to the smart material. The security mechanisms are configured and arranged with respect to the smart material to be actuated by the smart material.

In response to the smart material being connected to the electrified part, current enters the material causing it to change from its temporary deformed state to its initial, permanent shape. By changing its shape, the smart material actuates the associated security mechanism, such as by pulling a security lock into place, moving a cover plate into a position blocking user access to electrified components, and/or keeping closed a circuit draining unwanted charge.

The system can also include an electrical ground connected to the component having the unwanted charge. The smart material can be connected between the charged component and the ground (e.g., through a load such as a resistor, alarms, an inductive coil, etc.) and/or hold together the connection between the charged component and the ground.

In some embodiments, the system includes one or more alarms connected in the circuit between the electrified part and the ground. Example alarms include visual alarms, such as a light, and audible alarms, such as a siren or horn and also provide a passive means of reporting to a monitoring system. In some embodiments the monitoring system can be any central computerized and/or manned system for tracking and notifying personnel and/or other systems of relevant events. A relevant event could be, for instance, a safety system including an SMA being engaged in response to stimuli such as: (i) Joule heating from an unwanted electric current, (ii) unwanted ambient or environmental temperature change, such as heat from a fire or engine compartment (e.g., a radiator) or from a cryogenic environment, such as a container or room housing liquid nitrogen, (iii) unwanted radiation. The monitoring system in some embodiments includes a remote processing center, such as the OnStar® system (OnStar is a registered trademark of OnStar, LLC, a subsidiary of the General Motors Company).

Benefits of the present technology include protecting persons from electrical shock by one or more of automatically locking an enclosure, blocking access to charged components, providing a visual or audible notification of the unwanted charge, and draining the charge. Other benefits include the provision of such protections using unwanted electricity, and so without use of, and so conservation of, other electricity. The provision is also made in each case without the cost or other burdens related to complex devices such as a computer processing unit. As still another benefit, the technology of some embodiments of the present technology are configured and arranged to perform their desired functions (e.g., lock, block, drain, warn) not only automatically, but also until the performance is no longer needed—that is, until the unwanted charge has been removed or at least alleviated to a sufficient degree.

FIG. 2

Figure 2:
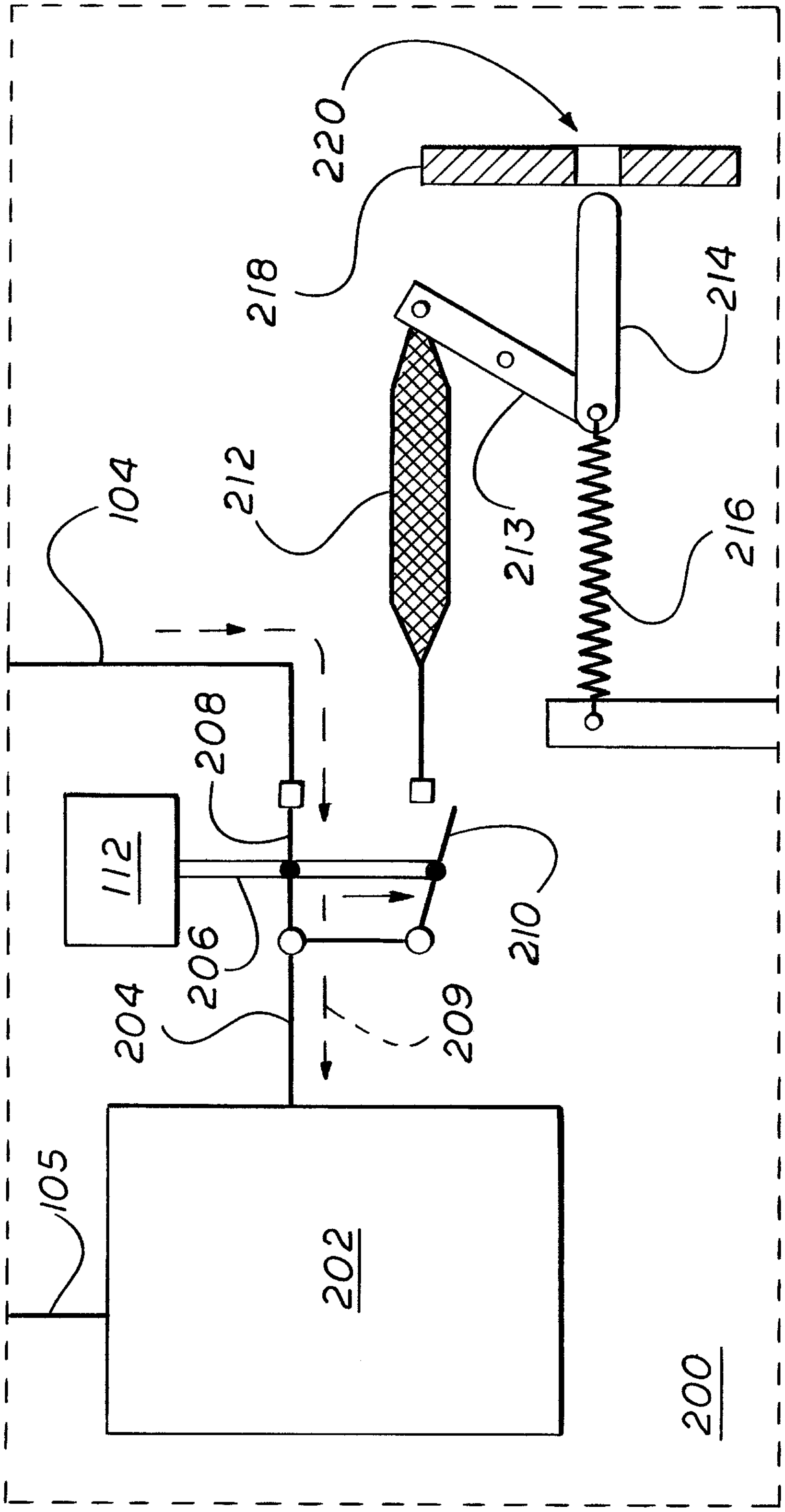
FIG. 2 illustrates a sub-system, for automatically locking an electrical system, in an unactuated state, while a main system power switch is turned on, according to a first embodiment of the present technology.

Returning to the figures, FIG. 2 illustrates a schematic block diagram of an environment or system 200 in which the present technology is implemented. The components shown in FIG. 2 can all be a part of a single apparatus, such as an electrical power or control box.

The system 200 includes at least one system component 202 powered by electricity received from a power input 104, such as the power line 104 shown in FIG. 1. The system component(s) 202 can include any of a wide variety of electrical devices or parts, such as fuses, computing circuitry, capacitor banks (groups of capacitors grouped together to build a larger charge), electrical motor drives and brakes, temperature controls, and programmable logic controllers (PLCs).

An electrical line 204 connecting the input 104 and the system component 202 selectively openable/closable. As an example, in one embodiment, the connection can be opened and closed by way of an actuator 112, such as the power switch shown in FIG. 1. With the actuator 112 in an on position, as shown in FIG. 2, a link 206 connected to or being a part of, the actuator 112 holds a first electrical switch 208 in a closed position, as also shown in FIG. 2. The link 206 includes one or multiple parts. The first electrical switch 208 is connected between the system component 202 and the power input 104. With the first electrical switch 208 closed, as shown in FIG. 2, current 209 flows from the power input 104 to the system component 202.

In some embodiments, the electrical line 204 is considered a part of the electrical component 202. For instance, in embodiments that operate to limit access to the electrical component, to ward against a person being shocked (see e.g., FIGS. 4 and 8), the protections can be said to limit access by the person to the electrical component, generally, which can include conducting parts connected electrically to the electrical component 202, such as the lines 204, 210 (see e.g., FIG. 8). The electrical component 202 can include one or numerous conducting parts that can carry unwanted charge.

The system 200 is also configured such that when the power switch is in the on position, a second electrical switch 210 is open. The second electrical switch 208 is connected between the component 202 and a transformable material 212, such as a smart material.

Figure 3:
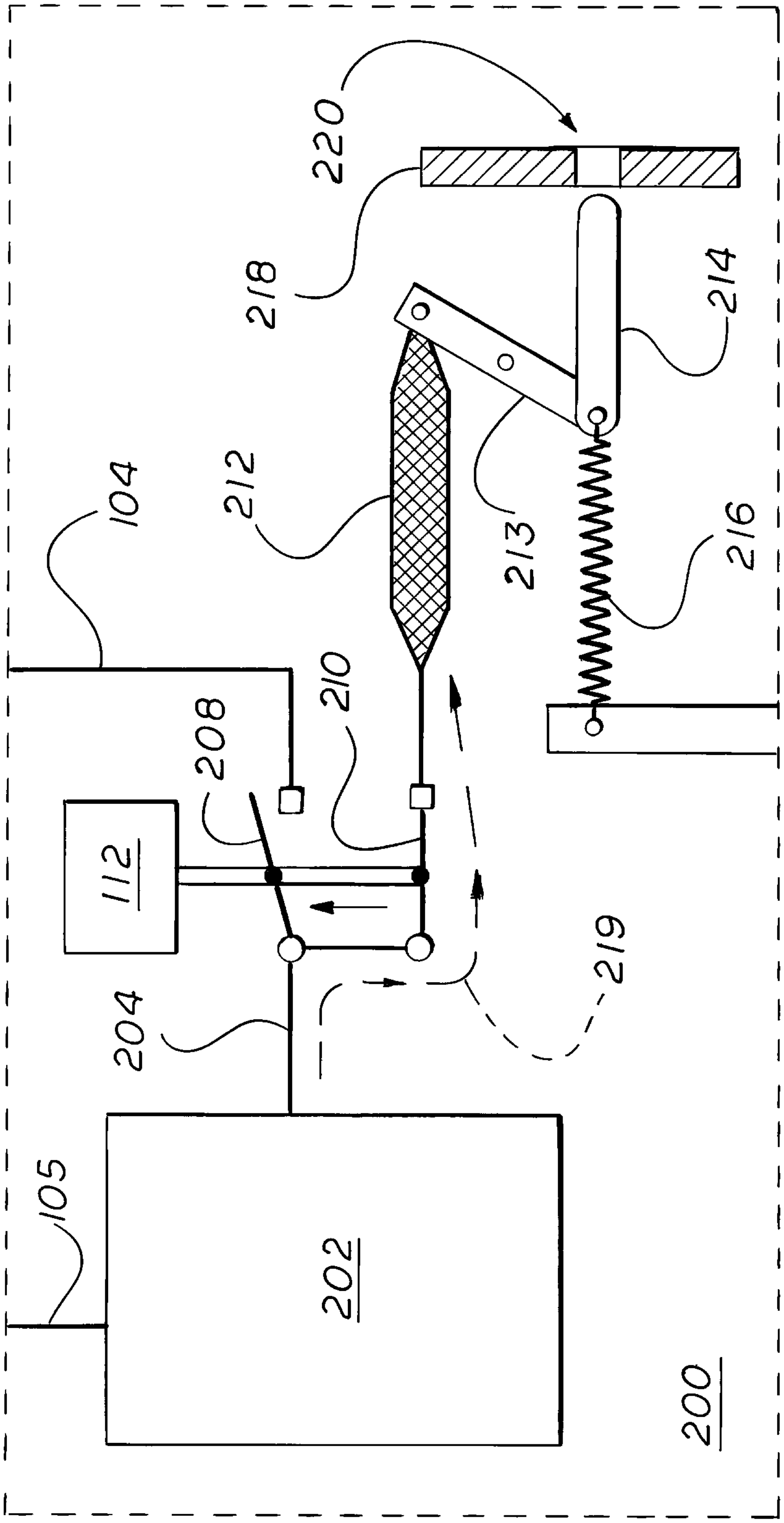
FIG. 3 illustrates the sub-system of FIG. 2 in an unactuated state while the main system power switch is turned off, according to an embodiment of the present technology.

Exemplary smart materials for use in this aspect, i.e. shape memory alloys, are described above. As shown schematically in FIGS. 2 and 3, the link 206 is configured and arranged to (i) effect closing of the first electrical switch 208 and, simultaneously, opening of the second electrical switch 210, when the power switch 112 is in its on position (FIG. 2) and (ii) effect opening of the first electrical switch 208 and simultaneously closing of the second electrical switch 210, when the power switch 112 is in its off position (FIG. 3).

The smart material 212 is connected directly or indirectly to a security mechanism, such as a locking component 214. In the example of FIG. 2, the smart material 212 is connected to the locking component 214 by way of an intermediate component 213. In this example and other embodiments, the intermediate component 213 operates to translate a first motion of the smart material to a second motion of the locking component 214, as described further below.

In some embodiments, the locking component 214 is biased toward the unlocked position shown in FIG. 2 by a biasing component 216, such as a tension spring. The biasing component 216 could alternatively or in addition include other springs, such as a coil spring, or a non-spring biasing device.

The locking component 214 can include any common locking parts such as a latch or a pin, as shown by way of example in FIG. 2. The locking part of the locking component 214 is connectable to a complementing part 218, such as a plate or other securing component having a receptacle 220 for receiving a latch or pin. The complementing part 218 is a part of the security mechanism actuated by the smart material 212 and, in some embodiments, the complementing part 218 is considered a part of the locking component 214. In some embodiments, the smart material 212 is considered a part of what is referred to as the security mechanism, actuating selectively other parts of the security mechanism, while in others it can be considered to connect to and actuate selectively distinct parts of the security mechanism.

FIG. 3

In response to the actuator 112 being switched to an off position, as shown in FIG. 3, connection between the power input 104 and the component 202 is cut off. Particularly, as shown, in response to the switch being switched to its off position, the link 206 (a) moves the first electrical switch 208 to a disconnected position, breaking/opening the connection between the input 104 and component 202, and (b) moves the second electrical switch 210 to a connected position, closing a connection between the component and the smart material.

With the second electrical switch 210 closed, any unwanted electrical charge present in the system component 202 flows as current 219 from the system component 202 through the second electrical switch 210 to the smart material 212, as shown in FIG. 3.

FIG. 4

Figure 4:
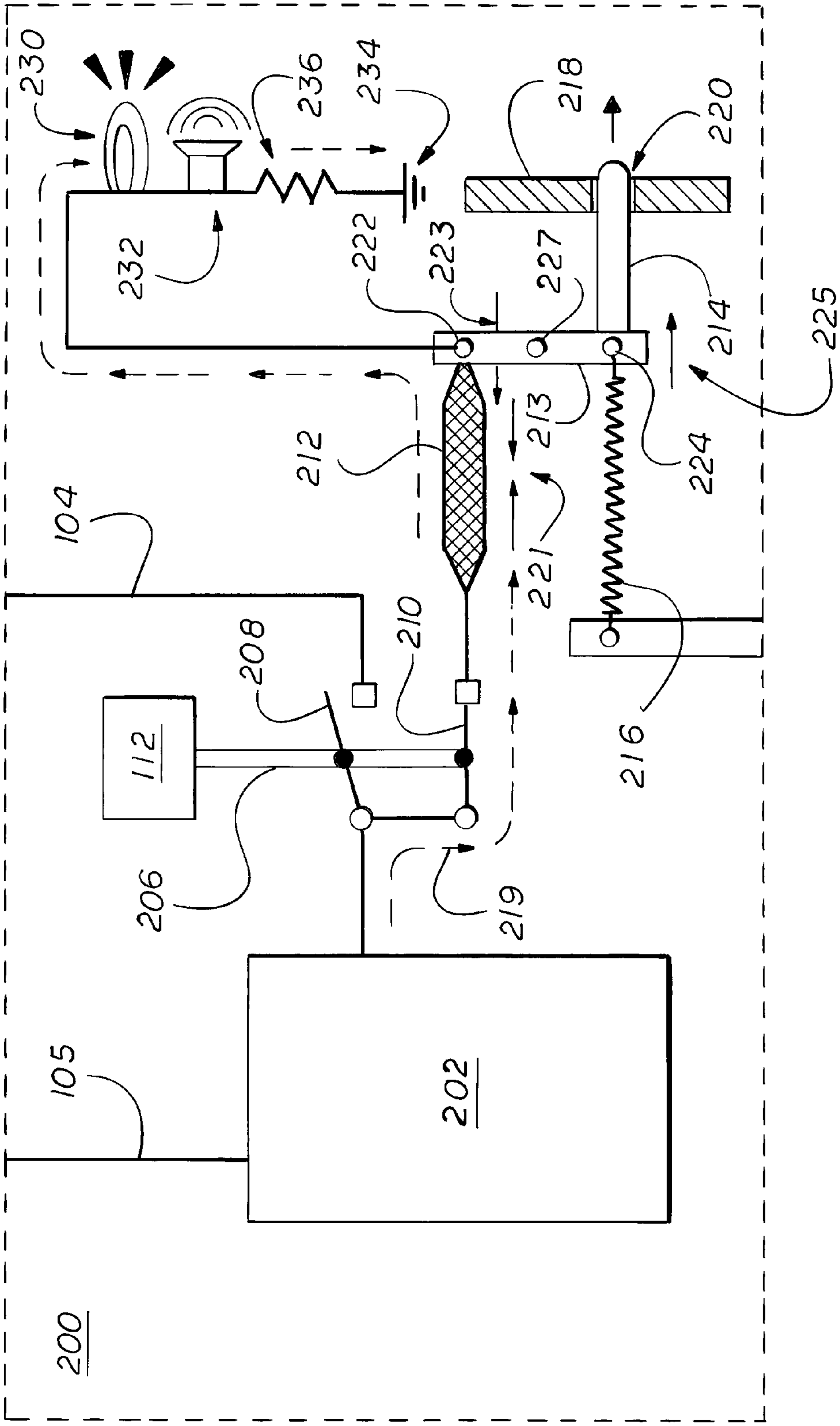
FIG. 4 illustrates the sub-system of FIG. 2 in an actuated state, while the main system power switch is turned off, according to an embodiment of the present technology.

In response to the smart material 212 being connected to the electrified system component 202, the current 219 enters or at least affects (e.g., heats) the material 212 causing the material to return from its deformed shape shown schematically in FIGS. 2 and 3, to its initial permanent shape, shown schematically in FIG. 4. The deformation is shown schematically by arrows labeled by reference numeral 221.

As shown in FIG. 4, the smart material 212 is connected to a first joining part or portion 222 at, adjacent, or near an intersection of the smart material 212 and the intermediate component 213. In the illustrated example, the part includes a rotational-linear feature allowing the smart material and intermediate component 213 to move with respect to each other angularly and linearly. The example linear movement caused at the first joining part or portion 222 by the smart material 212 deforming is shown by an arrow labeled by reference numeral 223 in FIG. 4.

The intermediate component 213 in turn rotates (counterclockwise in the schematic view of FIG. 4) about a pivot 227 causing movement of a second joining part or portion 224. Like the first, the second joining portion of this example also includes a rotational-linear feature. By the first joining portion 222 rotating and moving to the left (arrow 223), the second joining portion 224 is caused to rotate and move to the right as shown by an arrow labeled by reference numeral 225 in FIG. 4. Directional indicators, such as left, right, up, down, provided herein are arbitrary and given for ease of description and understanding concepts of the present technology.

The second joining portion 224 moving to the right, in the schematic view of FIG. 4, causes the locking component 214 to also move toward the right. The locking component 214 moving sufficiently toward the right engages the complementing lock part 218, such as a plate, by entering a receptacle 220 thereof. The complementing lock part 218 is secured into place, at the position shown schematically in FIG. 4, by mating with (e.g., receiving) the locking component 214.

The parts connecting the smart material 212 and the locking component 214 can be referred to generally as intermediate parts. These include at least the intermediate component 213. The first joining portion 222 can be a part of the intermediate parts or of a sub-system including the smart material 212. The second joining portion 225 can be a part of the intermediate parts or of a sub-system including the locking component 214.

In some embodiments, there are not intermediate parts. Rather, the smart material 212, which can include ancillary connecting features such as the first joining portion 222, as described, is effectively connected directly to a safety mechanism, including the locking component 214 in the example of FIGS. 2-5, wherein the locking component can include ancillary connecting features such as the second joining portion 224, as also described.

It will also be appreciated that intermediate parts illustrated are merely schematic representations of various forms of intermediate parts, beyond just a pivot arrangement. In a contemplated embodiment, for example, the intermediate parts include a rack-and-pinion arrangement. For instance, a pinion can be associated to rotate with movement of the smart material due to its deformation and a rack can be connected to both the pinion and the locking component 214 so that the rack translates linearly in response to rotation of the pinion.

The smart material 212 is in some embodiments considered a part of a charge drain or relief sub-system. A function of the sub-system is to drain or alleviate unwanted charge in the system 200 and, particularly, for example, unwanted charge from the electrical component(s) 202. In some embodiments (not shown in detail in FIG. 2), the smart material 212 is not a part of the charge drain or relief sub-system.

As referenced above, the system 200 in some embodiments includes one or more alerts or alarms 230, 232. The alarms 230, 232 are connected in-circuit to the electrical component 202 in response and/or while the smart material 212 is actuated. For instance, in the example of FIGS. 2-4, the alarms 230, 232 are connected to the electrical switch 210 so that when the switch 210 is moved from its open position (FIGS. 2 and 3) to its closed position (FIG. 4), the current 219 draining from the electrical component 202 flows to the alarms 230, 232.

The alarms 230, 232 can be positioned in various positions with respect to the smart material 212. For instance, while they are shown in FIG. 4 positioned between the smart material 212 and an electrical ground 234, the figures and description are also to be considered to provide one or more of the alarms 230, 232 being positioned between the smart material 212 and the electrical switch 210.

While two alarms are shown, the alarms 230, 232 in some embodiments include any number of distinct or combined alarm devices. The alarm devices portrayed by way of example include a visual alarm 230, such as a light, and an audible alarm 232, such as a horn or a siren.

In some embodiments, the alarms 230, 232 can be considered to include a monitoring system or at least a connection to such a monitoring system for providing signals (e.g., electrical signal), message (e.g., e-mail, phone message), sound, light, etc, to such a monitoring system. In some embodiments the monitoring system can be any central computerized and/or manned system for tracking and notifying personnel and/or other systems of relevant events. A relevant event could be, for instance, a safety system including an SMA being engaged in response to stimuli such as: (i) Joule heating from an unwanted electric current, (ii) unwanted ambient or environmental temperature change, such as heat from a fire or from a cryogenic environment, such as a container or room housing liquid nitrogen, (iii) unwanted radiation. The monitoring system in some embodiments includes a remote processing center, such as the OnStar® system referenced above.

In embodiments in which the alarms 230, 232 are present and positioned to receive current 219 stemming from the unwanted charge of the electrical component 202, the alarms are considered a part of the charge drain or relief sub-system mentioned above. The relevant alarms thus contribute to the function of draining or alleviating unwanted charge in the system 200 and, particularly, for example, unwanted charge at the electrical component(s) 202. The alarms do this by drawing some of the current for their operation.

The aforementioned electrical ground 234, when present as described, is considered a part of the charge drain or relief sub-system mentioned above, contributing to the function of draining or alleviating unwanted charge from the system 200 and, particularly, for example, from the electrical component(s) 202.

The system 200 can also include one or more resistors 236. The resistor 236 can be positioned in various positions with respect to the smart material 212. For instance, while it is shown in FIG. 4 positioned between the smart material 212 and the electrical ground 234, the figures and description are also to be considered to provide one or more resistors 236 positioned between the smart material 212 and the electrical switch 210. In embodiments in which the resistor 236 is present and positioned to receive current 219 stemming from the unwanted charge of the electrical component 202, the resistor 236 is considered a part of the charge drain or relief sub-system mentioned above. Relevant resistors 236 thus contribute to the function of draining or alleviating unwanted charge in the system 200 and, particularly, for example, unwanted charge at the electrical component(s) 202. The resistor 236 does this by drawing some of the current by way of its resistive properties.

While shown schematically within the system 200, it will be appreciated that the electrical ground 234 or parts thereof may be external to the system 200. This same possibility exists for each of the parts described and shown in connection with the systems provided. For example, any one or more of the parts of the systems 200, 700 shown in FIGS. 2-4 and 6-9 can be completely or partially within the system or completely or partially outside of and connected to the system. In addition to the example of the electrical ground 234 being partially or completely outside of and connected to the system 200, any of the electrical component 202, the alarms 230, 232, the resistor 236, and all or some of the security mechanism (e.g., the complimenting lock component 218/220) can be partially or completely outside of and connected to the system 200.

Figure 14:
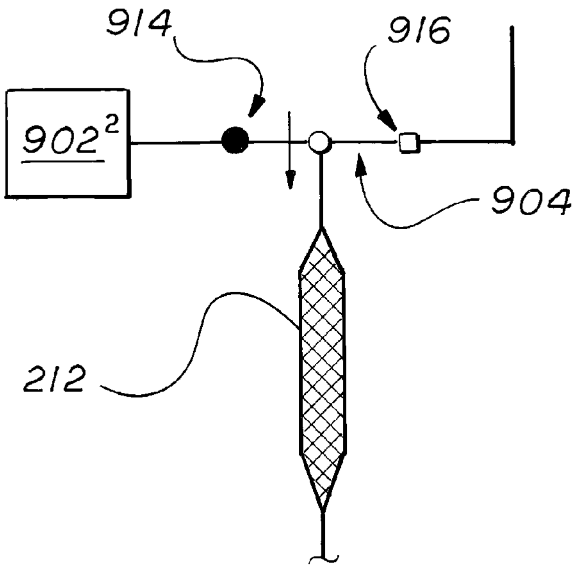
FIG. 14 illustrates the second example triggering component of FIG. 13 in an actuated state.

In some embodiments, the system 200 is configured and arranged so that movement of the smart material 112 by its shape recovery (shape memory) acts to hold closed a connection (e.g., the second electrical switch 210) between the electrical component 202 and the drain or relief sub-system. This function can be seen in the schematic visualization of FIG. 14. By this arrangement, connection between the electrical components and drain/relief sub-system components is maintained as long as there is unwanted charge flowing to the smart material 212 causing it to remain in its undeformed state, e.g., constricted as compared to a pseudo-plastically deformed shape. In such embodiment, when the unwanted charge is removed or reduced sufficiently, the smart material 212 will be stretched by the biasing element (e.g., the biasing element 216 shown in FIG. 8) to return to or at least markedly toward its as-installed, stretched, shape, and thereby the smart material 212 will completely stop or to an extent stop holding closed the connection between the electrical component and the drain/relief sub-system. Operation of the components shown in FIG. 14 is described below in more detail.

FIG. 5

Figure 5:
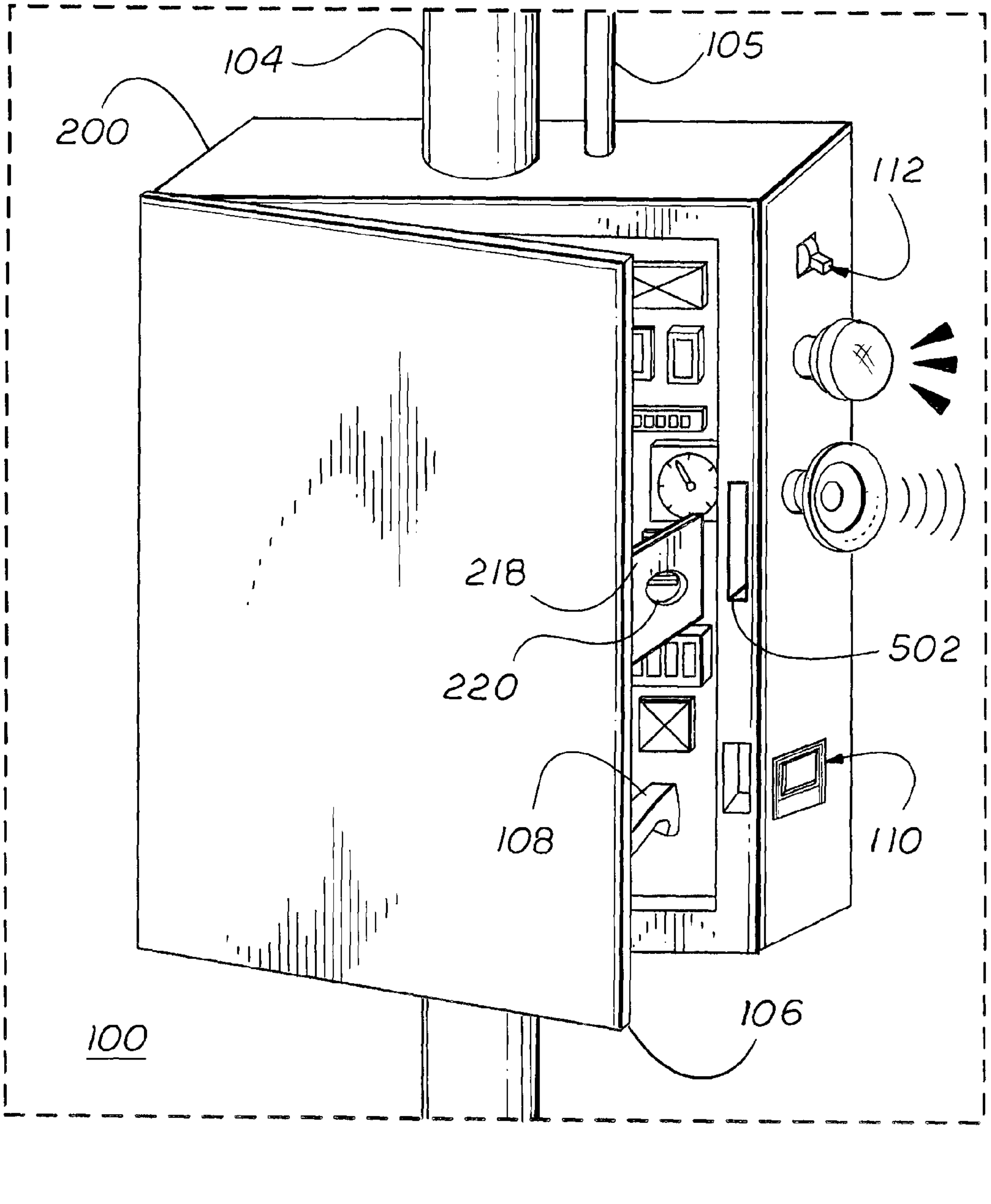
FIG. 5 illustrates a breaker or control box according to the present technology.

FIG. 5 shows an exemplary system 200 in the form of an electrical box, such as a control or power box. The complementing lock part 218 and the receptacle 220 are shown connected to a door 106 of the system. In one embodiment, the system 200 includes a partial or complete housing having an opening 502 sized and shaped to receive the complimentary locking part. The parts and the operation of the system 200 shown in FIGS. 2-6 are described further below in connection with FIG. 6.

FIG. 6

Figure 6:
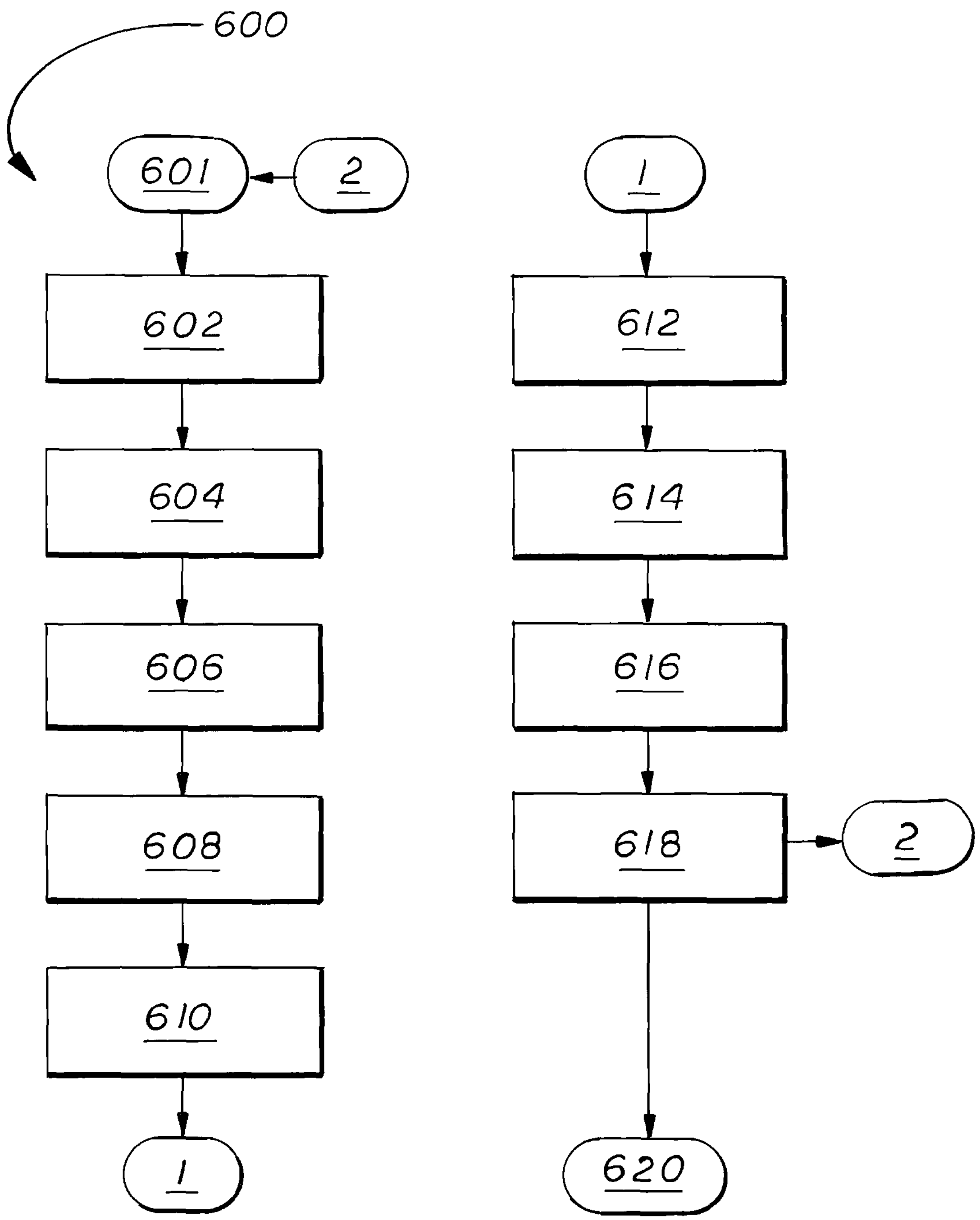
FIG. 6 illustrates a method of operation of the systems described herein.

FIG. 6 shows an exemplary method 600 of operation of the technology of the present disclosure. It should be understood that the steps of the method 600 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time.

The method 600 begins and flow proceeds to block 602, whereat power to the system 200 can be turned on, such as by the switch 112 being turned to its on position, thereby allowing power to flow to the system 200 via the primary power input 104 (components shown in FIGS. 2-5). In one embodiment, when the door 106 is closed and the power to the system 200 is turned on the door 106 is locked from being opened. In this case, for example, the door 106 may be held from opening by the conventional lock 108. And, in this case, the conventional lock release 110 is disabled or its usual unlocking effect otherwise blocked.

At block 604, power to the system 200 is turned off, such as by the switch 112 being turned to its off position, thereby stopping flow of power from the primary power input 104 to system 200. In some embodiments, this switching action also causes disengagement of the conventional lock (e.g., lock 108). As described above and shown in connection with FIGS. 2 and 3, the power-off function disconnects a first link 208 to the electrical component 202 and connects a second link 210 to the electrical component 202.

In response to the power being turned off, and the second link 210 being closed, at block 606, any unwanted charge, in the electrical component 202, that is connected electrically to the electrical line 204 begins to flow, as the described current 219 (shown in FIGS. 3 and 4), through the line 204, through the second link 210, and towards the smart material 212.

As provided, the unwanted charge can exist from one or more of various reasons. For instance, a residual power may still be in the system 200 by not having discharged from each of one or more sub-units of the system 200 (e.g., electrical components 202). In this event, personnel accessing the box may be exposed undesirably to the charge, believing that they were safe due to the box being unlocked. As another example source of unwanted charge, some systems (e.g., power or control boxes) have secondary power feeds—e.g., in addition to the primary power feed 104 shown in FIGS. 1-5.

Whatever the source(s) of the unwanted charge in the system (e.g., electrical component 202), absent operation of the present technology, components of the system 200 (e.g., power box) can remain charged even after the main switch is tripped and the mechanical lock released. In that conventional case, persons accessing the box could be exposed undesirably to the charge, believing that it was safe to access the box due to the box opening and/or the switch being turned off.

At block 608, the electric current 219 (FIGS. 3 and 4) reaches the smart material 212 and the smart material 212 drives to return to its undeformed state in response. More particularly, for example, as referenced above, in response to the smart material 212 being connected to the electrified component 202, the current 219 enters or at least affects (e.g., heats) the material 212 causing the material to return from its pseudo-plastically deformed shape, shown schematically in FIGS. 2 and 3, to its undeformed, permanent shape, shown schematically in FIG. 4. The deformation recovery is shown schematically by arrows labeled by reference numeral 221 in FIG. 4.

At block 610, the deformation recovery of the smart material 212 overcomes biasing element(s) to actuate a safety mechanism, such as the locking features 214, 218, 220, as described above. Particularly for instance, the system 200 can include one or more intermediate parts, such as a pivot or a rack-and-pinion arrangement.

While the safety mechanism actuated by smart material 212 deformation recovery in the embodiment shown in FIGS. 2-5 includes the locking features 214, 218, 220, the safety mechanism actuated by such deformation recovery in the embodiment shown in FIGS. 7 and 8 includes a cover or other blocking component, as described in more detail below in connection with those figures.

Figure 9:
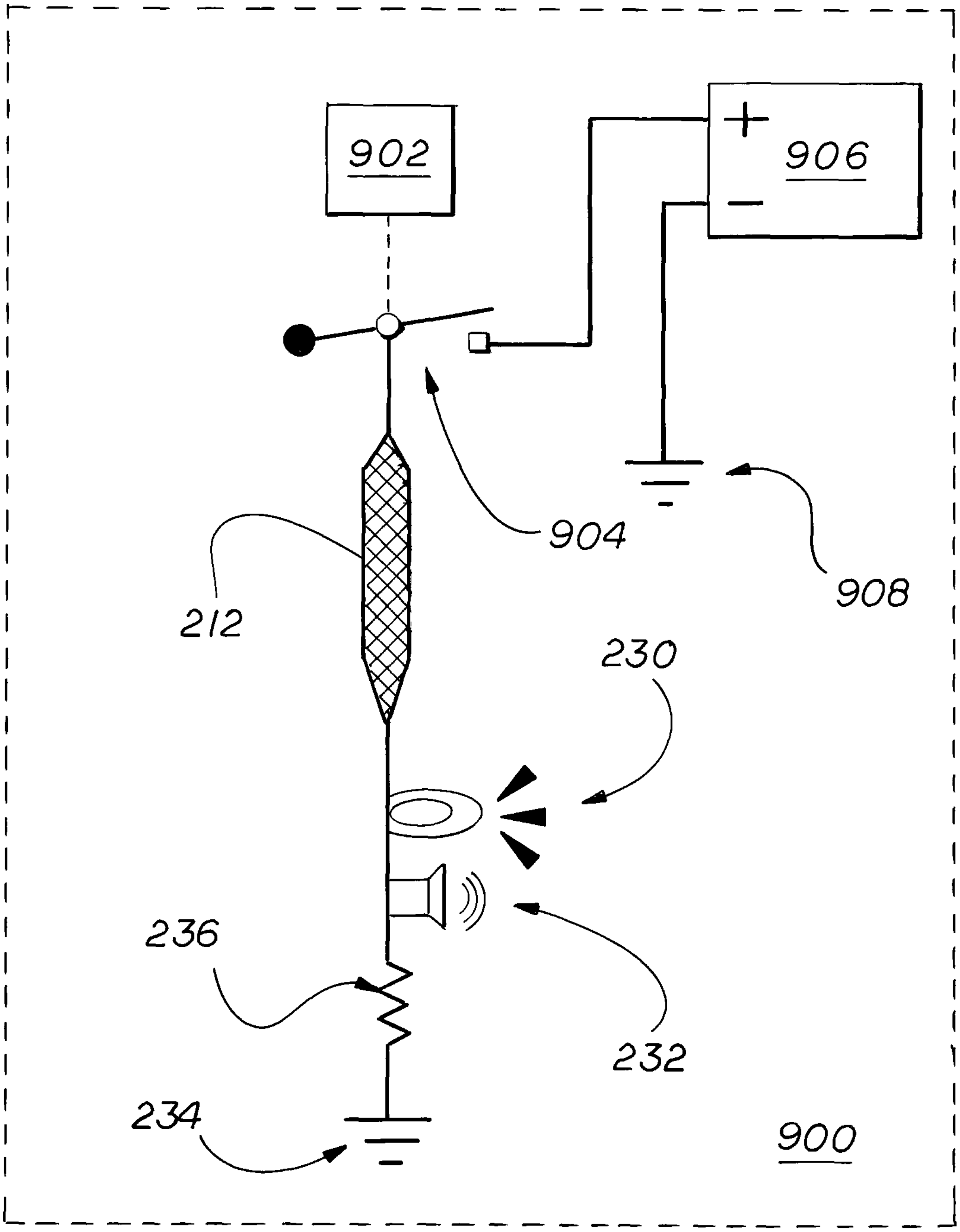
FIG. 9 illustrates a sub-system, for automatically locking an electrical system, having a triggering component, in an unactuated state, according to a third embodiment of the present technology.
Figure 10:
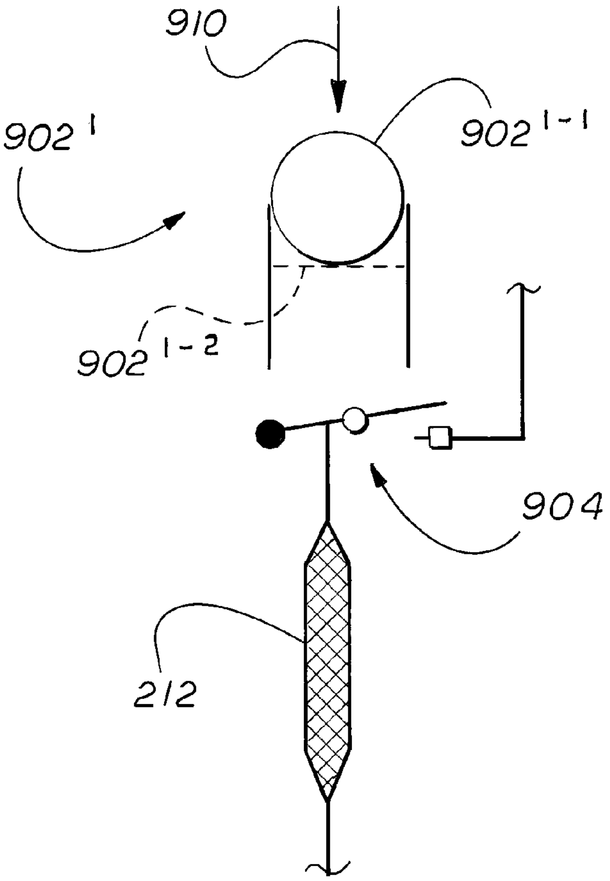
FIG. 10 illustrates a first example triggering component, in an unactuated e, for the sub-system shown in FIG. 9.

In the embodiment of FIGS. 9-10, the safety mechanism includes holding closed a connection between the electrical component 202 and a drain/relief sub-system including the smart material 212, so that current from unwanted charge can flow between the component 202 and sub-system until the unwanted charge is removed or reduced to a sufficient degree, as described in more detail below in connection with those figures.

At block 612, the electrical current 219 from the unwanted charge reaches alarms 230, 232, which are described above. The alarms operate to warn personnel in one or more ways, such as by visual or sound warnings, that unwanted current is still present in the system 200.

At block 614, the electrical current 219 from the unwanted charge reaches other parts such as one or more resistors 236 and an electric ground 234.

As provided, above, various components described herein can have various functions. For instance, the smart material 212 can operate to actuate one or more safety mechanisms (e.g., move and hold in place a lock, a cover, and/or an electrical connection (to promote charge drainage)) as well as to dissipate the unwanted charge and current. Other features described as dissipating the unwanted charge and current (i.e., part of a charge drain or relief sub-system) include the alarms, the resistor, and the electrical ground.

At optional block 616, all or a sufficient amount of charge is drained from the system 200 e.g., the electrical component(s) 202. Step 616 is referred to here as optional because in some scenarios, the unwanted charge is of such an amount that it will not be readily drained. For instance, in the example of the box being powered by a secondary source (e.g., the separate NC line, such as a 120-volt line), and that secondary source being mis-connected, the charge of the secondary source will not likely be fully drained by the smart material 212 and other components of the present technology, or at least not for a long time.

For cases in which act 616 is effected, the current 219 previously flowing to the smart material 212 is gone or decreased to such a degree so that the smart material 212 changes back toward its as installed deformed shape (the deformed shape shown in FIGS. 2 and 3) under action of the biasing element 216. In response, the safety mechanism(s) (e.g., move and hold in place a lock, a cover, and/or an electrical connection (to promote charge drainage)) is released. This release, or return, are in some embodiments facilitated by return bias provided by a bias feature 216, such as the tension spring described above.

As another result of the current stopping or becoming sufficiently low at block 616, any previously-actuated alarms would stop providing their alert notice.

In a contemplated embodiment, the method 600 also includes an act 618 of analyzing, diagnosing, and possibly performing maintenance on the system. The maintenance can include, for example resetting or replacing features of the safety technology described herein. The analysis and diagnostic functions could include determining that the unwanted charge was caused by mis-wiring associated with the secondary input power line 105. Follow-up maintenance could include correcting the mis-wiring.

The process 600 can end 620 or be repeated as indicated by the return line identified by link 2 in FIG. 6.

Figure 7:
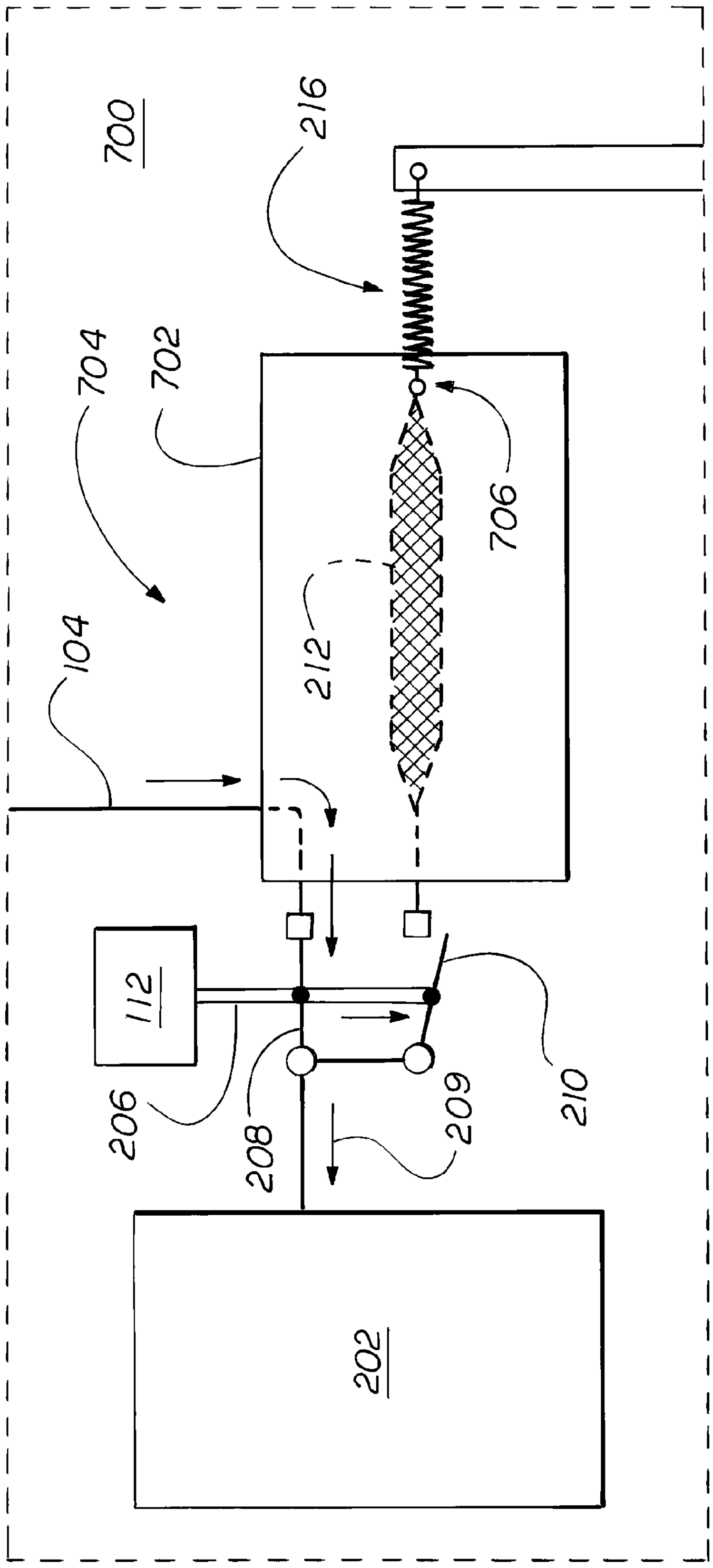
FIG. 7 illustrates a sub-system, for automatically shielding components, in an unactuated state, while a main system power switch is turned on, according to a second embodiment of the present technology.
Figure 8:
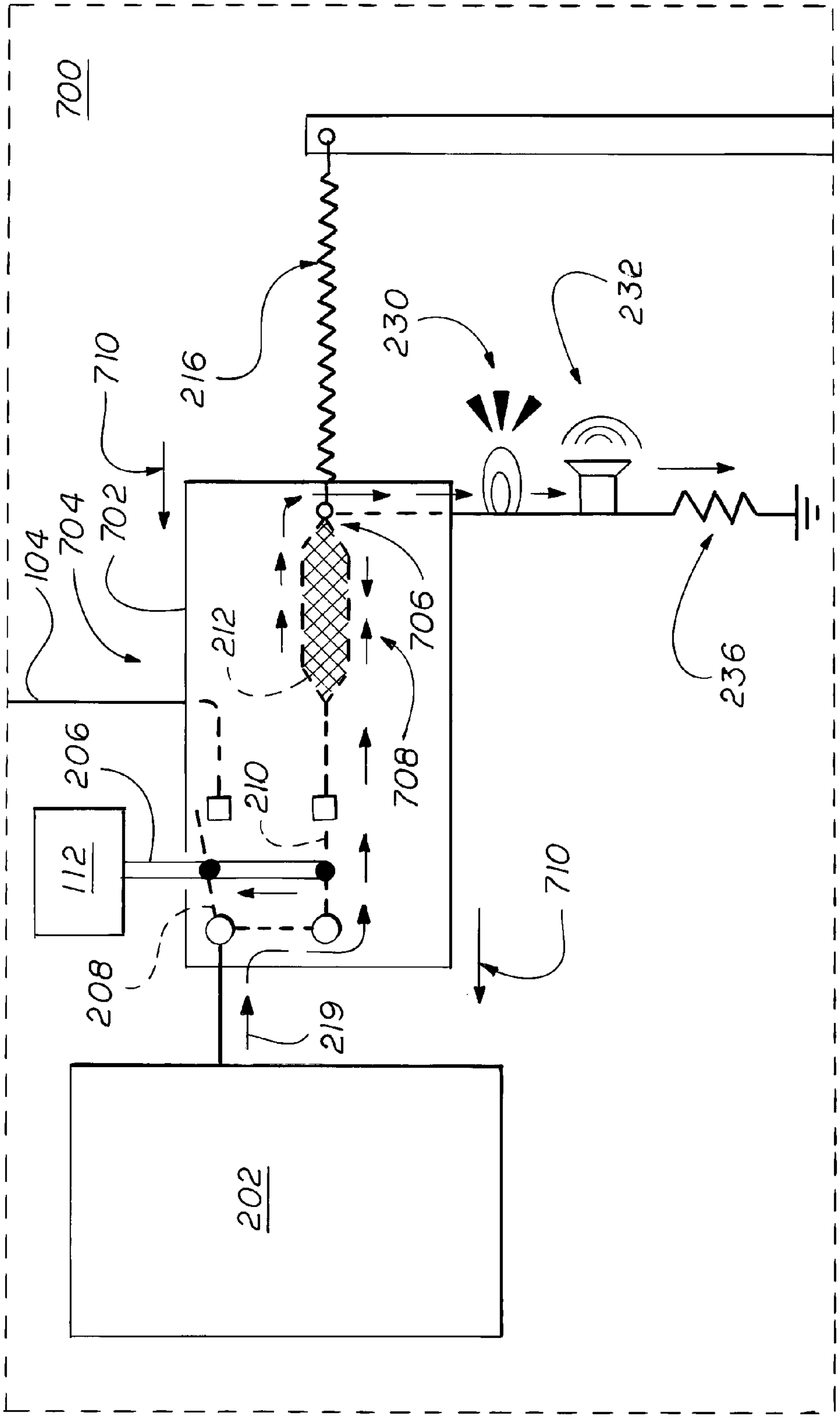
FIG. 8 illustrates the sub-system of FIG. 7 in an actuated state, while the main system power switch is turned off, according to an embodiment of the present technology.

FIGS. 7 and 8

FIGS. 7 and 8 show an exemplary system 700 according to another embodiment of the present technology. This embodiment, including a blocking cover, was referenced above.

The embodiment of FIGS. 7 and 8 is the same or similar in many ways to the embodiment of FIGS. 2-5. Common features are identified in the figures by common reference numerals. Common features and functions are not described again here for brevity and the above discussion about the same should be considered incorporated into this portion about the embodiments of FIGS. 7 and 8.

A primary difference between the embodiments is that in place of showing the locking features (e.g., features 214, 218, 220 in FIGS. 2-5), FIGS. 7 and 8 show a blocking or cover feature 702. While this feature is referred to herein for simplicity as the cover 702, the form of the feature is not limited to what might be conventionally thought of as a cover. The feature 702 can also be referred to, for instance, as a blocking or covering member 702 or blocking or covering feature, component, part, etc. 702.

The cover feature 702, or simply cover 702, can include one or more components. In FIG. 7, a single primary component, a cover or cover plate 704 is shown. Elements connected to the cover plate 704 can also be considered a part of the cover 702, such as the connection point 706 described below. As provided above, a primary purpose of the cover feature 702 is to be movable selectively from and, at least, to a position in the system 700 whereat the cover feature will block user access to electrified components.

The cover 704 can have any of a wide variety of shapes and sizes without departing from the scope of the present technology. For instance, the cover 704 in some embodiments is planar or at least includes a planar element. The cover 704 is shown by a rectangle in FIGS. 7 and 8, but with the figures being schematic, the cover is not limited to a rectangular shape. In one embodiment, the cover is shaped (e.g., custom-shaped) to have a shape corresponding to the electrical elements that it is purposed to block when moved to its blocking position.

The smart material 212, which can be the same or similar to that described in connection with FIGS. 2-5, is in the embodiment of FIGS. 7 and 8 connected to the cover feature 702. The smart material 212 is connected to the cover 702 at one or more connection points 706. By the connection point(s) 706, certain motion of the smart material 212 translates to certain corresponding motion of the cover 702.

In this embodiment, the smart material 212 can be actuated in the same way it is actuated in the embodiments of FIGS. 2-5 described above. Once actuated, the smart material changes its shape such as by constricting, i.e. recovery of its pseudo-plastic deformation imposed by the biasing element 216. By this change in shape, the connection point 706 moves, thereby moving the cover 702. In the schematic example of FIGS. 7 and 8, the smart material 212 changes from it shape shown in FIG. 7 to its shape shown in FIG. 8, causing movement of the connection point 706 and linked cover 702 from their respective positions in FIG. 7 to those of FIG. 8.

The example shape change of the smart material 212 is indicated in FIG. 8 by arrows labeled by reference numeral 708. Movement of the cover 702 is indicated in FIG. 8 by arrows labeled by reference numeral 710.

The system 700, including the smart material 212, cover 702, and related parts, are configured and arranged so that the cover 702, upon being moved to its blocking position or blocking state, shown in FIG. 8, schematically, blocks or covers access to electrical parts of the system 700 that are or may be electrically charged and otherwise accessible by personnel. The electrical parts being blocked can be the electrical components 202 themselves or wires and/or other electrical constructs connected thereto. Merely by way of illustration and example, the cover 702 is shown in FIG. 8 as covering certain of the electrical wires and connectors coming from the electrical component 202. The system 200 can just as easily be arranged so that all such wires and connectors, the electrical component(s), and/or other electrically-charged or possibly charged elements are blocked by the feature 702 when the system 700 is in the blocking state.

As referenced above in connection with FIGS. 2-5, a system according to the present technology can include more than one safety mechanism. For example, a smart material 212 can be configured and connected in a system and operate to pull a security lock into an engaged position, move a cover plate 704 into a position whereat it blocks user access to electrified components, and/or keep closed a circuit draining unwanted charge—the latter (the keep-closed) function being shown generally in FIG. 14 and described below more in connection with that figure.

Operation of the system 700 of FIGS. 7 and 8 is similar to the operation of the system 200 described in connection with FIGS. 2-5 and especially with FIG. 6. A primary distinction being that the security mechanism focused on in the system 700 of FIGS. 7 and 8 is the cover 702 compared to the security mechanism focused on in the system 200 of FIGS. 2-5 and 6 being the lock features. As provided in description of the method 600 of FIG. 6, the security mechanism described therein could be the cover 702 in addition to or instead of the lock mechanism.

FIG. 9

FIG. 9 shows a system 900 according to another embodiment of the present technology. The system 900 includes a triggering component 902 configured and arranged to selectively cause closure of an electrical link 904.

The electrical link 904 is connected to a power source 906. The system 900 can also include one or more electrical grounds 908, 234. The power source is in some particular embodiments a local power source, such as a battery.

A goal of the system 900 is to, at a select time, drain or relieve sufficient charge from the power source 906. By the present technology, the triggering component 902 would trigger closure of the electrical link 904 thereby commencing a drain procedure to drain or release the charge form the battery and preferably any other elements to which charge is at the time present.

Figure 13:
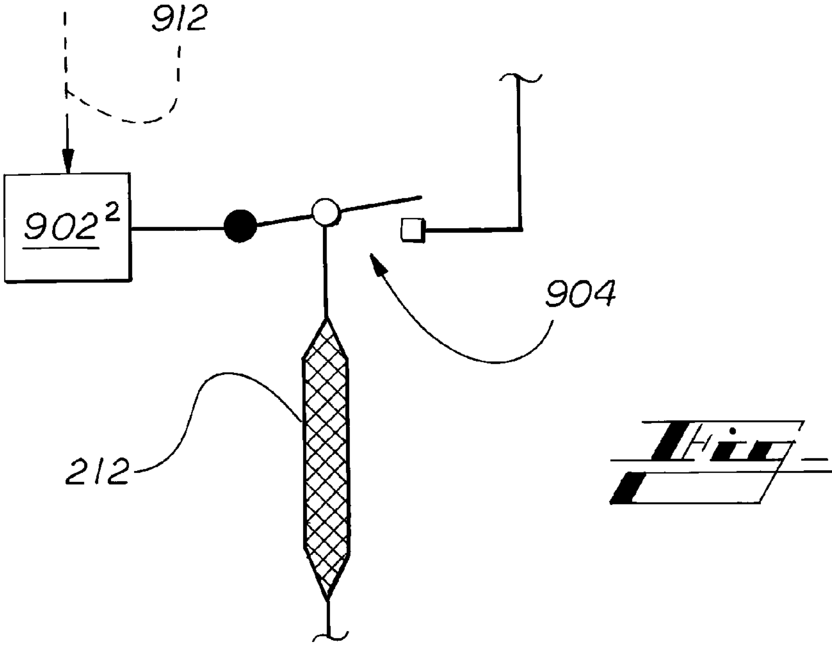
FIG. 13 illustrates a second example triggering component, in an unactuated state, for the sub-system shown in FIG. 9.

FIGS. 10 and 13 show two alternate embodiments of the triggering component. 902.

FIG. 10

In FIG. 10, the triggering component 902 (FIG. 9) includes a sensor arrangement $\mathbf{902}^{1}$ configured to react to certain motion or action. In one particular embodiment, the sensor arrangement $\mathbf{902}^{1}$ is a ball-and-tube sensor arrangement, or other type of impact or intense-motion sensor. In this embodiment, an activating element $\mathbf{902}^{1\text{-}1}$ such as a ball, is configured and arranged to pass a holding feature $\mathbf{902}^{1\text{-}2}$, such as a thin film, releasable brackets, fingers, or the like, in response to sufficient force 910, such as that caused in an impact event.

FIG. 11

Figure 11:
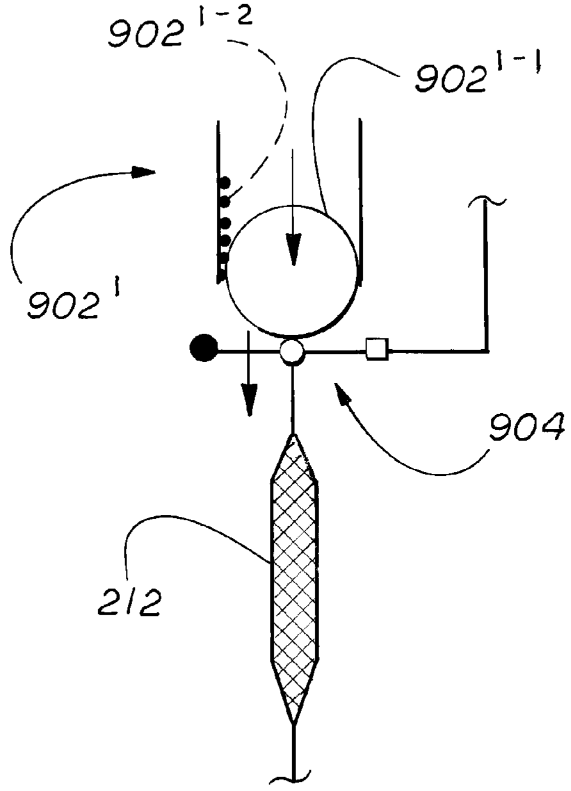
FIG. 11 illustrates the first example triggering component of FIG. 10 in an actuated state.

FIG. 11 shows the features of FIG. 10 after the triggering component (e.g., sensor arrangement) $\mathbf{902}^{1}$ shown is activated, such as by a force 910. As shown, the activating element $\mathbf{902}^{1\text{-}1}$ was caused by the force 910 to overcome the holding effect of the holding feature $\mathbf{902}^{1\text{-}2}$, and continue to contact and close the electrical link 904.

FIG. 10

Figure 12:
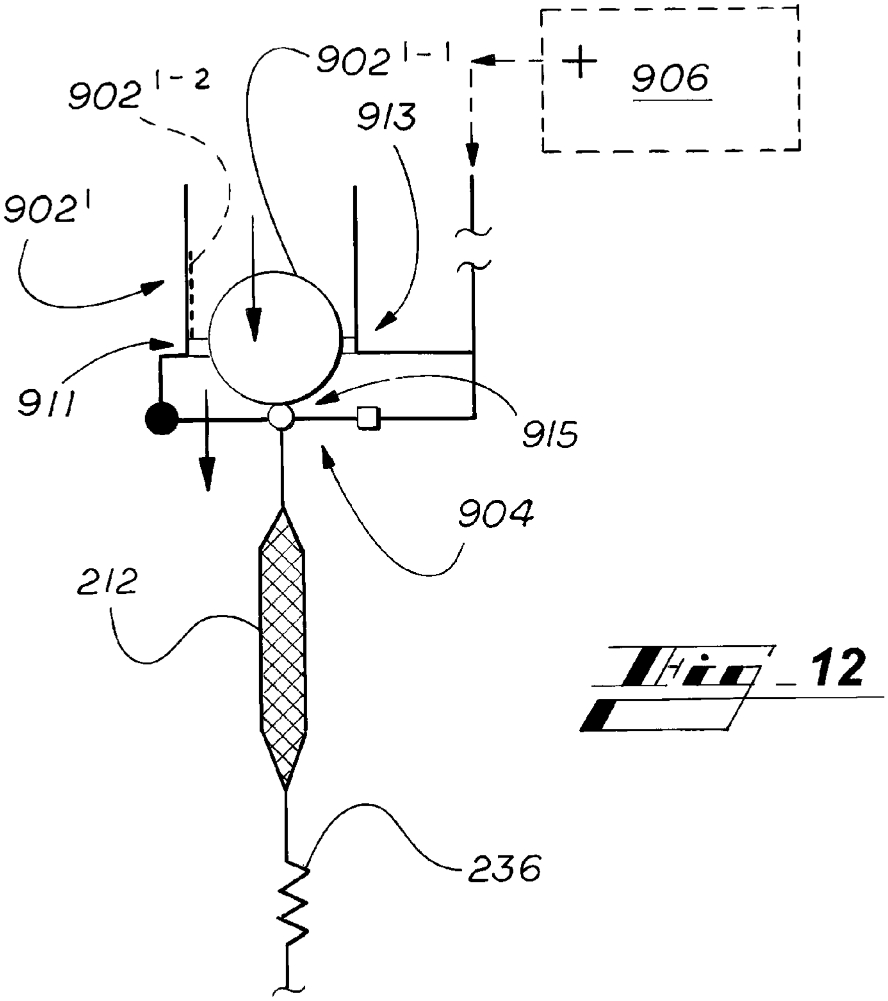
FIG. 12 illustrates a second example triggering component, in an actuated state.

FIG. 10 shows an embodiment in which the ball $\mathbf{902}^{1\text{-}1}$ includes a conductive material and the system is arranged so that the ball, when falling into place, completes a circuit as shown in the figure, allowing current to flow from source 906, shown partially by dashed lines in FIG. 12, and more expressly in FIGS. 9 and 10.

In one embodiment, the ball $\mathbf{902}^{1\text{-}1}$ includes steel or another conductive metal or conductive material. The resistor(s) 236, as in all illustrated embodiments, can be a current limiter configured to control by limiting the amount of current that can pass through the circuit branch including the SMA, thereby avoiding the SMA being exposed to too high of a current.

By completing the circuit shown in FIG. 12, including the source 906, the ball $\mathbf{902}^{1-1}$, and the SMA 212, the SMA 212 receives current from the source 906. By this current, the SMA 212 heats by joule heating, thereby causing the SMA 212 to contract to its original configuration. The source 906 can be drained via this circuit, it is also seen in FIG. 12 that the system can be configured and arranged to provide a second circuit flowing also from the source 906, but directly to the SMA 212, and not through the ball $\mathbf{902}^{1-1}$. In this embodiment, the system is configured and arranged robustly wherein current has two alternate routes to travel—e.g., if one route breaks, charge in the source 906 can still drain through the SMA 212 via the other route.

In one contemplated embodiment, the system is arranged so that the ball does not physically move the closing portion 904 to its closed position (e.g., at the area indicated by reference numerals 915 in the figure: rather the system is arranged so that there is a space between the ball and the closing portion 904). Rather, the ball, by contacting the contacts 911, 913, creates the first circuit allowing the current to flow to the SMA 212, and the SMA in response contracts, thereby closing the closing portion 904.

FIG. 13

In FIG. 13, the triggering component 902 (FIG. 9) includes a relay arrangement $\mathbf{902}^2$, or a common signal source, configured to react to an input signal by causing closure of the electrical link 904. The relay arrangement includes a triggering component including a relay arrangement $\mathbf{902}^2$.

FIG. 14

FIG. 14 shows the features of FIG. 13 after the triggering component $\mathbf{902}^2$ is activated, such as by an electrical signal or an electronic message 912. As shown, the activating element $\mathbf{902}^2$, in response to the signal or message 912, effects closure of the electrical link 904. In one embodiment, the relay $\mathbf{902}^2$ does this by causing a current to flow to the smart material 212, such as via the relay $\mathbf{902}^2$, or other signal source, through the line shown between the relay and the smart material 212. In a contemplated embodiment, the relay $\mathbf{902}^2$ causes the closure by causing a joint 914, such as a hinge, to move to close the link 904. In another contemplated embodiment, the relay effects the closure by causing movement of (e.g., by pulling or pushing) a connecting end 916 of the link 904. In some embodiments, the relay initiates connection between the power, or charge, source and the actuator (SMA), being exposed to the current, and operates as described to hold closed the connection until power is drained beyond a point of being able to provide enough current to hold the SMA in its actuated state.

FIG. 15

Figure 15:
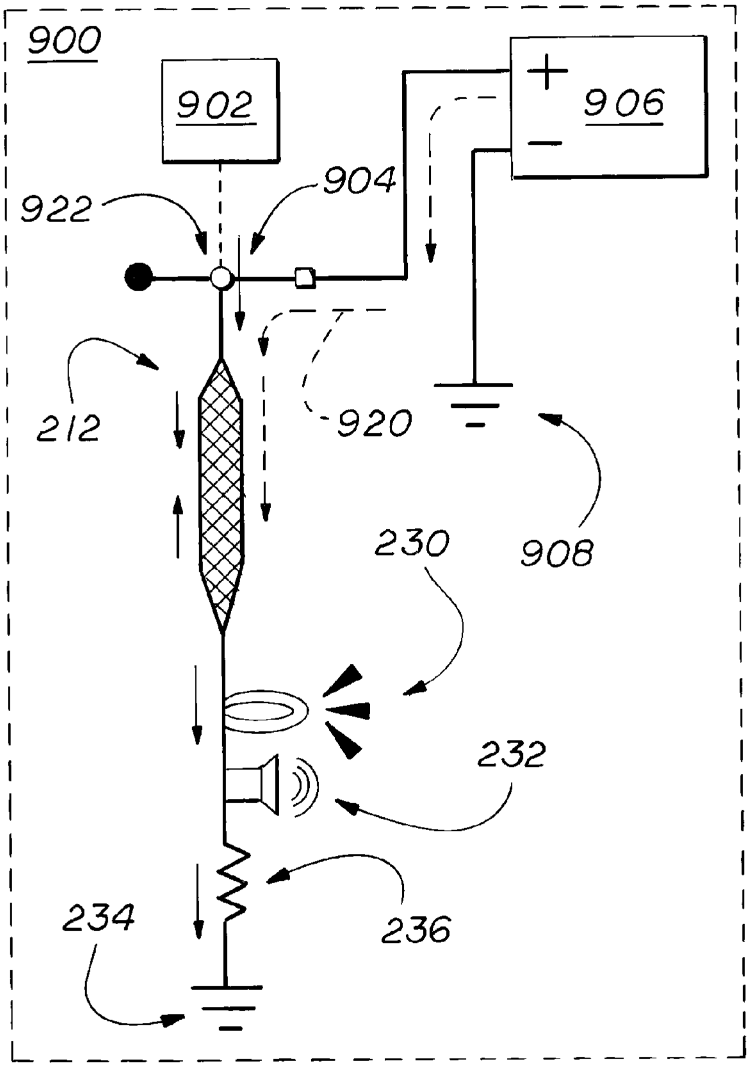
FIG. 15 illustrates the sub-system of FIG. 9 in an actuated state, according to an embodiment of the present technology.

FIG. 15 shows the system 900 after the triggering component 902, whatever the type (e.g., $\mathbf{902}^1$ or $\mathbf{902}^2$), has acted to close the electrical link 904. When the electrical link 904 is closed, current 920 is able to flow, from the power source 906 and/or any other charged elements connected to the link 904, through the link 904 and to the smart material 212. In response to being exposed to the current 920, the smart material 212 changes shape as described above. For instance, the smart material 212 contracts. By changing to an undeformed shape, the smart material 212 pulls on a contact piece 922 connected to the smart material 212 and the electrical link 904 thereby holding the electrical link 904 toward its already-existing closed position.

In these ways, once the system is triggered, including closing of the electrical link 904, the link 904 will stay closed by operation of the technology including the smart material 212 until, if ever, all or a sufficient amount of charge is drained from the power source and/or any other charged elements connected to the link 904. By these operations, persons contacting parts of the system 700, are less likely to be shocked by charge that theoretically could originate from the power source 906 and, if they are, to be shocked by a possibly much smaller charge than would be the case if the draining up to that time had not occurred.

The alarms 230, 232, the resistor 236, and the electric ground 234 can operate in substantially the same manner as described above in connection with other embodiments.

In one embodiment, the system 900 includes a biasing component, such as that shown expressly in FIGS. 2-4, FIG. 16, and FIG. 17, configured and arranged in the system to bias the closing portion 904 to an open position (e.g., the position shown in FIG. 9). As shown in those other figures, and described in connection with the various embodiments in the present disclosure, the biasing component can include a spring, for instance, such as a compression or tension spring. In the embodiment of FIG. 15, when the current passing through the SMA 212 decreases sufficiently, such as by the source 906 being drained sufficiently as desired, the SMA 212 will cool, rendering the SMA weaker with a lower elastic modulus, thereby allowing the biasing element to overcome the force of the SMA 212, and the biasing element to thereby pull the connection 904 open.

FIG. 16

Figure 16:
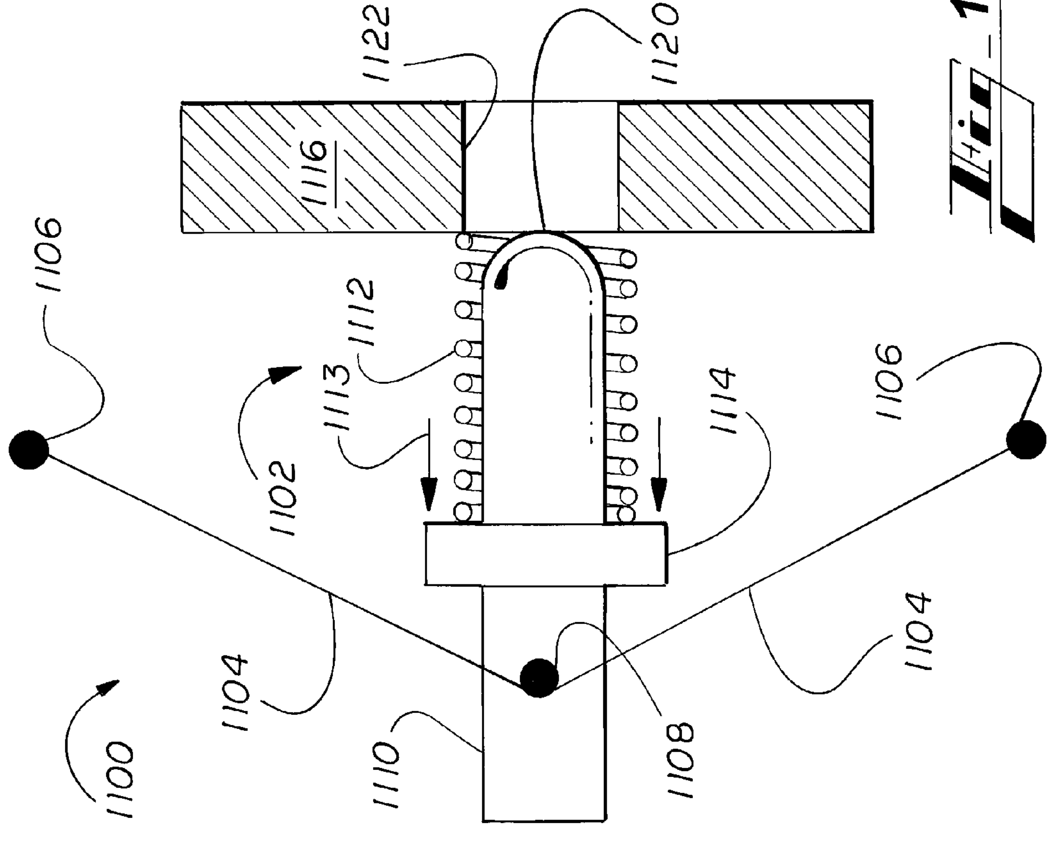

FIG. 16 shows a system 1100 for actuating a safety mechanism 1102. The system 1100 can be used to protect persons from any one or more of various conditions including heat, cold, or radiation. For instance, the system can be used in conjunction with, or include, an opening such as a door of a steam tunnel, oven, or room or other structure that could separate the persons from an unwanted heat. Regarding cold, the system can be used in conjunction with, or include, an opening such as a door of a cryogenic chamber or room or other structure that could separate the persons from an unwanted low temperature. Regarding radiation, the system can be used in conjunction with, or include, an opening such as a door of a radiation container, room, or other structure that could separate the persons from unwanted exposure to radiation.

As a particular example regarding protection from unwanted heat, in an automobile or other vehicle, the system 1100 can be used to protect persons from accessing a radiator via the radiator cap, when the heat and pressure therein are above levels to which one should be directly exposed. For instance, the base part or surface 1116 shown in FIG. 16 and described below can be or be connected to a radiator cap. The figures are considered to show analogously the system 1100 for locking components like a door of a room, a door of a steam tunnel, etc.

The system 1100 includes a transformable material 1104, such as a smart material, which is in one embodiment a Shape Memory Alloy (SMA) such as those described herein above. In some embodiments the safety mechanism 1102 is considered a part of the system 1100, and in other embodiments it simply interacts with the system 1100.

The transformable material 1104 may be sized, shaped, and arranged in any of a wide variety of manners sufficient to actuate the safety mechanism when the material changes from a first form to a second form (e.g., contracts). In the embodiment illustrated in FIG. 16 expressly, the material 1104, e.g., SMA, is in an elongated form. Further in this embodiment, the material 1104, which can have a wire or cable geometrical form, extends between two connecting points such as the exemplary points 1106 shown in FIG. 16 and FIG. 17. At an intermediate portion of the material 1104, the material 1104 engages a contact point 1108 of the safety mechanism 1102.

FIG. 16 is also considered to show, in combination with other figures (e.g., FIGS. 2-4 and 7-10) and corresponding descriptions, the transformable material 1104 also having an elongated form, but instead of the arrangement shown expressly in FIG. 16, an embodiment in which the transformable material 1104 pulls directly on a part (e.g., part 213 in FIG. 2, part 216 in FIG. 7, or part 904 in FIG. 9) to actuate the safety mechanism 1102. Such part can be considered as a part of the safety mechanism or connected to the safety mechanism 1102.

Although in the embodiment illustrated in FIG. 16, the safety mechanism 1102 includes a locking component 1110, the figure in conjunction with the other figures (e.g., FIGS. 7 and 8) and descriptions herein is considered to also constructively show an embodiment in which the security mechanism 1102 is a cover or shield (like the shield 702 of FIGS. 7 and 8).

The locking component 1110 is connected to a biasing component 1112 configured and arranged in the system to bias the safety mechanism 1102 to a non-engaged position (shown schematically in FIG. 16). This biasing of the locking component 1110 is, in the example of FIG. 16, toward the left, as shown by the arrows 1113. In the example of FIG. 16, the biasing component 1112 is a compression spring.

The spring of this example is at a first end connected to or at least positioned to selectively engage a flange 1114 or other bias-contact part of the locking component 1110. The spring of this example is at a second end connected to or at least positioned to selectively engage a part such as a base part or surface 1116. As shown, the surface 1116 can be a part of a complementing locking part, which is in some embodiments analogous to the complementing part 218 shown in FIG. 2.

In one embodiment, the biasing component is a tension spring connected directly or indirectly to the locking component 1110, such as the spring 216 shown in the embodiment of FIG. 2.

The locking component 1110 includes an engagement portion 1120 positioned and arranged to be inserted into or otherwise engage a receiving part 1122 (like, e.g., the receptacle 220 of FIG. 2). In cases in which the base part 1116 and receiving part 1122 are parts of, or connected to, a rotating device, such as an automobile radiator cap, the engagement portion 1120 can be referred to as a detent, having the purpose of keeping the base part 1116 from moving (e.g., rotating to remove the cap).

In one embodiment, the transformable material 1104 is an SMA smart material arranged at a temporary shape shown in FIG. 16 while at a low temperature at which the SMA has a relatively low modulus. More particularly, at low temperature, the SMA 1104 can be pseudo-plastically deformed by the biasing element 1112 (or by hand), thereby moving the safety mechanism 1102 to its disengaged position shown in FIG. 16. These same concepts can apply to the transformable materials and configurations and arrangements thereof in connection with the embodiments of FIGS. 2-4 and 7-10.

FIG. 17

Figure 17:
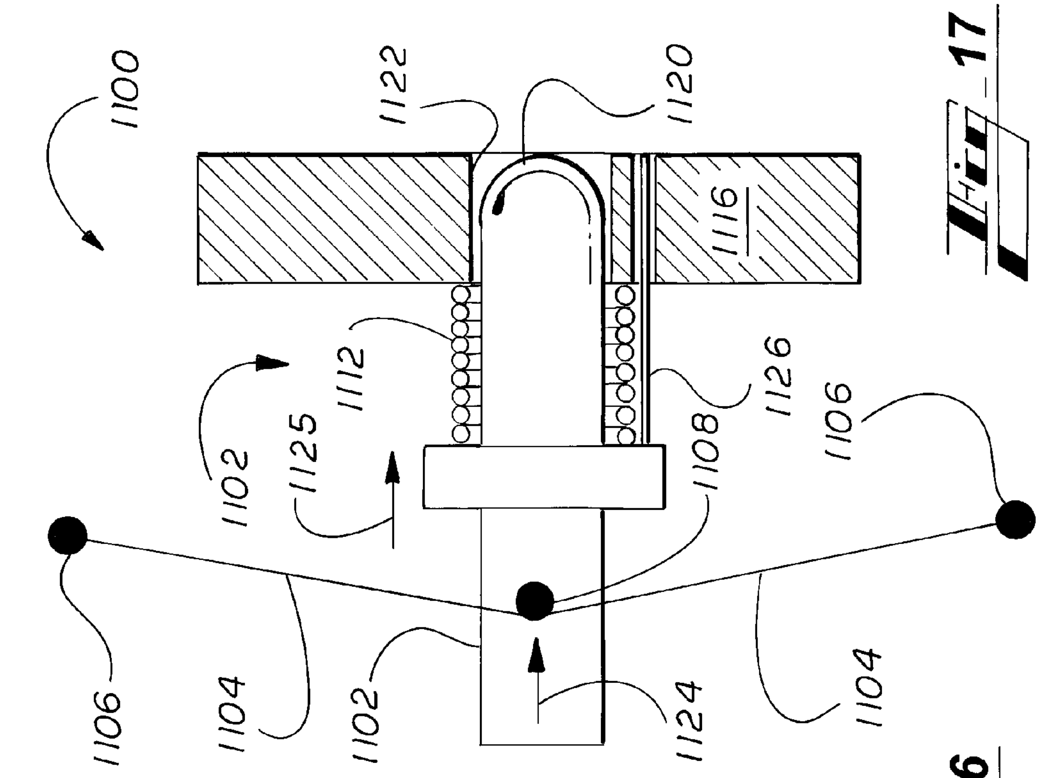
FIGS. 16 and 17 illustrate a sub-system, for automatically locking a system in response to a predetermined stimulus, according to another embodiment of the present technology.

FIG. 17 shows the system 1100 of FIG. 16 with the safety mechanism 1102 moved to its engaged state. The system 1100 is moved to this engaged state by the transformable material 1104, e.g., SMA, activating. The SMA 1104 activates, by contracting, when exposed to a sufficient stimuli.

It can be seen that, in the embodiment expressly shown in FIG. 17, because the connection points 1106 are fixed, the SMA 1104 contracting creates an actuating force 1124 against the contact point 1108 of the safety mechanism 1102 (i.e., toward the right in the schematic of FIG. 17). This force 1124 causes the safety mechanism 1102 to also move i.e., toward the right in the schematic of FIG. 17, as shown by motion arrow 1125. The SMA 1104 and biasing component 1112 are selected, and the relevant components including these are configured and arranged so that, when the SMA 1104 is exposed to sufficient stimuli, the force 1124 created by it is sufficient to overcome bias of the biasing element 1112 (i.e., toward the left in the schematics of FIG. 16 and FIG. 17 (see e.g., arrow 1113 in FIG. 16)).

When the safety mechanism 1102 moves toward the right in FIG. 17, the engagement portion 1120 (e.g., detent) thereof is moved to its engaged position within the receiving part 1122 (e.g. receiving part of an automobile radiator cap or other base part 1116).

The concepts of the present embodiments regarding SMA activation and results of the activation can be similarly applied in different configurations and arrangements such as by using an SMA arrangement like that shown in FIGS. 2-4. Thus, for example, an arrangement like that shown in FIGS. 2-4 could be configured and arranged to be actuated by a sufficient stimuli other than joule heating from an electric current, such as by a sufficient heat, sufficient lack of heat (e.g., cold), sufficient radiation, or the other stimuli referenced herein.

These concepts described in connection with locking can at the same time or instead be equally applied to the shielding uses described (e.g., in connection with the shield 702 of FIG. 7). In this case, the shield could be a heat shield, such as a heat, fire, and/or flame resistant shield, of any needed size and shape.

When the stimuli is removed or subsides to a sufficient degree or amount, such as by a temperature in an automobile radiator (a temperature to which the SMA 1104 is exposed) cools sufficiently, the SMA cools and thereby will again adopt its low temperature, deformable state, whereby the biasing mechanism 1112 will again be able to push the safety mechanism 1102 out of its engagement—i.e., toward the state shown in FIG. 16. In this way, with the relevant temperature in a safe range, the opening associated with the base part 1116, such as a radiator cap, can be safely removed or opened by personnel.

It will be appreciated by those skilled in the art that the same concepts can be applied to scenarios in which the system 1100 is arranged to protect persons from cold, such as in a cryogenic environment. As a first primary example, the system 1100 can be configured and arranged (e.g., SMA 1104 and biasing element 1112 selection/characteristics, positioning, etc.) so that the engaging portion 1120 is engaged when the SMA is exposed to a temperature that is below a select temperature. This embodiment can operate to protect personnel from extremely low temperatures, such as those in a container or room having liquid nitrogen or other very cold agent.

In one implementation, the system 1100 is arranged so that the mechanism 1102 is disengaged in response to the temperature to which the SMA 1104 is exposed being sufficiently high (i.e., not too cold). For this case, the biasing element 1112 can be configured and arranged to bias the safety mechanism 1102 toward the engaged or disengaged state.

As a second primary example, the system 1100 can be configured and arranged (e.g., SMA 1104 and biasing element 1112 selection/characteristics, positioning, etc.) so that the engaging portion 1120 is engaged when the SMA is exposed to a radiation that is above or below a select radiation value. This embodiment can operate to protect personnel from high radiation levels, such as those in a container or in or outside of a room. For this embodiment, the SMA 1104 would be at least partially covered with a coating (e.g., sleeve, patch(es), stripe(s), etc.) of a second material configured to heat or cool in response to certain levels of radiation. For this case, the figures are considered to show such partial or full covering by the lines therein surrounding the SMA 1104 (or e.g., lines for item 212 in other figures). In operation, for instance, when the covered SMA 1104 is exposed to high radiation, the covering heats causing the SMA to contract, thereby moving the locking part, or shielding part into position. In this case, the shielding part can be a radiation shield of any needed size and shape.

In some embodiments, the system 1100 (or any of those of earlier embodiments, e.g., 200, 700) includes a manual release, shown schematically in FIG. 17 by reference numeral 1126, and considered shown similarly in connection with the other illustrated and described systems 200, 700. The release 1126 can be configured to be actuated by a special key or tool, for instance, or even a plain tool such as a screwdriver or other long implement used by persons, such as emergency responders (e.g., fire fighters). In one embodiment, the manual release 1126 can be activated by hand. As can be seen by the representation in FIG. 17, operation of the manual release 1126 moves the safety mechanism 1102 out of the engaged position shown in FIG. 17, toward the unengaged position shown in FIG. 16.

CONCLUSION

As provided, benefits of the present technology include protecting persons from electrical shock in one or more of a variety of ways. Other benefits include providing these protections (1) using unwanted electricity, and so without use of, and so conservation of, other electricity, and (2) without the cost or other challenges (e.g., maintenance) related to complex devices such as a computer processing unit. Another benefit is the systems being configured and arranged to perform their desired functions, not only automatically, but also until the need for performance is no longer needed—that is, until the unwanted charge has been removed or at least alleviated to a sufficient degree. In this event, the biasing element causes the actuator to reset (e.g., stretch to its temporary state).

Various embodiments of the present disclosure are disclosed herein. The disclosed embodiments are merely examples that may be embodied in various and alternative forms, and combinations thereof.

Some embodiments of the present technology can be referred to as passive-actuation systems, being configured and arranged to passively actuate one or more safety mechanisms—e.g., locking mechanism, blocking mechanism, and mechanism to hold an electrical connection closed thereby promoting drainage of unwanted electrical charge. The passive aspect of such systems relates to an ability of the system to actuate the safety mechanism(s) automatically without being triggered or controlled by an electric current and/or signal from a complex computing or controlling device system. Instead, activation is triggered merely by an environmental or situational condition, such as an unwanted temperature (unwanted ambient temperature), an unwanted current from residual charge in a component (e.g., power box), by unwanted radiation, or an electrical current from a secondary (e.g., control) signal to a component (e.g., power box). In the latter example, the electrical current is not formed and transferred to the present safety system for the purpose of operating the safety system, but rather the current is provided to devices distinct from the safety system (e.g., to a device such as a power box, and more particularly control aspects thereof, as compared perhaps to driving aspects thereof). In these regards, the system can be referred to as passive.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A personnel-protection system, for protecting humans from electrical shock from an electrical component, the system comprising:

a transformable material;

a safety mechanism comprising a movable blocking element; and a biasing element mechanically coupled to (i) the transformable material and (ii) the safety mechanism;

wherein:

the transformable material is coupled to the electrical component;

the transformable material is configured to actuate the safety mechanism by changing from a first shape to a second shape in response to receiving electrical current upon a discharge of the electrical component;

the biasing element is configured to facilitate changing the transformable material from the second shape to the first shape following the discharge; and the blocking element is configured and arranged in the system so that the blocking element, when actuated by the transformable material, moves to a blocking position to block human access to the electrical component.

2. The personnel-protection system of claim 1 wherein the safety mechanism includes an openable/closable electrical switch positioned between the transformable material and the electrical component.

3. The personnel-protection system of claim 2 further comprising:

a draining sub-system configured and arranged in the system to reduce unwanted electrical charge in the electrical component; and the electrical switch, wherein the electrical switch is configured and arranged in the system so that the electrical switch, when actuated by the transformable material, is in a closed position thereby maintaining an electrical connection between the electrical component and the draining sub-system.

4. The personnel-protection system of claim 3 wherein the transformable material is a part of the draining sub-system.

5. The personnel-protection system of claim 2 wherein:

the electrical switch is movable between an open position and a closed position; and the system further comprises a triggering component configured and arranged in the system to selectively activate and thereby cause the electrical switch to move to its closed position, thereby allowing the electrical current to flow from the electrical component to the transformable material.

6. The personnel-protection system of claim 5 wherein the triggering component is configured to activate responsive to a physical force at the system.

7. The personnel-protection system of claim 1 wherein:

the system is in an actuated state when the transformable material actuates the safety mechanism;

the system further comprises an alert feature configured and arranged in the system to emit an alert notification while the system is in the actuated state;

the system further comprises a draining sub-system configured and arranged in the system to reduce unwanted electrical charge in the electrical component; and the alert feature is a part of the draining sub-system.

8. The personnel-protection system of claim 1 wherein the blocking element includes a shield for blocking humans from accessing the electrical component.

9. The personnel-protection system of claim 1 further comprising a link, wherein the link is:

connected to a first electrical switch, the first electrical switch being located between the electrical component and a power source and movable between an open position of the first electrical switch and a closed position of the first electrical switch;

connected to a second electrical switch positioned, the second electrical switch being located between the electrical component and the transformable material and movable between an open position of the second electrical switch and a closed position of the second electrical switch;

movable between a first position and a second position; and configured and arranged in the system to:

move the first electrical switch to its open position, when the link is moved to the first position, thereby keeping electrical current from flowing from the power source to the electrical component by way of the first electrical switch; and move the second electrical switch to its closed position, when the link is moved to its first position, thereby allowing electrical current to flow from the electrical component to the transformable material by way of the second electrical switch.

10. The personnel-protection system of claim 9 wherein the link is further configured and arranged in the system to:

move the first electrical switch to its closed position, when the link is moved to the second position, thereby allowing electrical current to flow from the power source to the electrical component by way of the first electrical switch; and move the second electrical switch to its open position, when the link is moved to its second position, thereby keeping electrical current from flowing from the electrical component to the transformable material by way of the second electrical switch.

11. A personnel-protection system, for actuating a safety mechanism, to protect against exposure to an unwanted stimulus, using a transformable material, comprising:

a biasing element mechanically coupled to (i) the transformable material and (ii) the safety mechanism;

the safety mechanism configured to be selectively moved, against a force of the biasing element, by operation of the transformable material to one of an engaged position and an unengaged position; and the transformable material being configured and arranged in the system so that, in operation of the system, when the transformable material is exposed to the stimulus, the transformable material changes from a first form to a second form, thereby causing motion of the safety mechanism;

wherein:

the stimulus is selected from a group consisting of lack of heat and radiation; and the biasing element is configured and arranged in the system to facilitate changing the transformable material from the second form to the first form following exposure to the stimulus.

12. The personnel-protection system of claim 11, wherein the safety mechanism includes a shield.

13. A personnel-protection system, for protecting humans from electrical shock from an electrical component, the system comprising:

a transformable material;

a safety mechanism comprising a movable locking component; and a biasing element mechanically coupled to (i) the transformable material and (ii) the safety mechanism;

wherein:

the transformable material is coupled to the electrical component;

the transformable material is configured to actuate the safety mechanism by changing from a first shape to a second shape in response to receiving electrical current upon a discharge of the electrical component;

the biasing element is configured to facilitate changing the transformable material from the second shape to the first shape following the discharge; and the locking component is configured and arranged in the system so that the locking component, when actuated by the transformable material, moves to lock an access feature associated with the electrical component to limit human access to the electrical component.

14. The personnel-protection system of claim 13 wherein the safety mechanism includes an openable/closable electrical switch positioned between the transformable material and the electrical component.

15. The personnel-protection system of claim 14 further comprising:

a draining sub-system configured and arranged in the system to reduce unwanted electrical charge in the electrical component; and the electrical switch, wherein the electrical switch is configured and arranged in the system so that the electrical switch, when actuated by the transformable material, is in a closed position thereby maintaining an electrical connection between the electrical component and the draining sub-system.

16. The personnel-protection system of claim 15 wherein the transformable material is a part of the draining sub-system.

17. The personnel-protection system of claim 14 wherein the transformable material, when actuating to the second shape in response to receiving the electrical current, provides force on the electrical switch toward holding the electrical switch in the closed position.

18. The personnel-protection system of claim 14 further comprising a triggering component configured and arranged in the system to selectively activate and thereby cause the electrical switch to move to its closed position thereby allowing the electrical current to flow from the electrical component to the transformable material, wherein the triggering component is configured to activate responsive to a physical force at the system.

19. The personnel-protection system of claim 13 wherein:

the system is in an actuated state when the transformable material actuates the safety mechanism;

the system further comprises an alert feature configured and arranged in the system to emit an alert notification while the system is in the actuated state;

the system further comprises a draining sub-system configured and arranged in the system to reduce unwanted electrical charge in the electrical component; and the alert feature is a part of the draining sub-system.

20. The system of claim 13, wherein the locking component includes a lock connected to a door for blocking humans from accessing the electrical component.

* * * * *